(12) United States Patent
Ying

(10) Patent No.: US 11,483,743 B2
(45) Date of Patent: *Oct. 25, 2022

(54) HANDOVER METHOD, APPARATUS, AND SYSTEM

(71) Applicant: Huawei Technologies Co., Ltd., Guangdong (CN)

(72) Inventor: Jiangwei Ying, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/216,408

(22) Filed: Mar. 29, 2021

(65) Prior Publication Data

US 2021/0219188 A1 Jul. 15, 2021

Related U.S. Application Data

(63) Continuation of application No. 16/719,483, filed on Dec. 18, 2019, now Pat. No. 10,986,542, which is a
(Continued)

(30) Foreign Application Priority Data

Jun. 19, 2017 (CN) .......................... 201710465053.4

(51) Int. Cl.
*H04W 36/30* (2009.01)
*H04W 36/00* (2009.01)
(Continued)

(52) U.S. Cl.
CPC ....... *H04W 36/0009* (2018.08); *H04W 36/08* (2013.01); *H04W 36/30* (2013.01); *H04W 36/38* (2013.01); *H04W 88/04* (2013.01)

(58) Field of Classification Search
CPC . H04W 36/0009; H04W 36/08; H04W 36/30; H04W 36/38; H04W 88/04
See application file for complete search history.

(56) References Cited

U.S. PATENT DOCUMENTS 10,986,542 B2 * 4/2021 Ying ................. H04W 36/0009
2013/0322325 A1 12/2013 Hahn et al.
(Continued)

FOREIGN PATENT DOCUMENTS

CN 103002521 A 3/2013
CN 103200634 A 7/2013
(Continued)

OTHER PUBLICATIONS

R3-171405 Huawei: "RAN3 TP for FeD2D", 3GPP TSG-RAN3 Meeting #95bis, Spokane, Washington, USA, Apr. 3-7, 2017, total 7 pages.
(Continued)

*Primary Examiner* — Barry W Taylor
(74) *Attorney, Agent, or Firm* — Womble Bond Dickinson (US) LLP

(57) ABSTRACT

This application discloses a handover method to hand over relay UE and remote UE between different eNBs. The handover method includes: a source eNB determines based on a measurement report of the relay UE, to hand over the relay UE to a target eNB; sends a first handover required message to a source MME of the relay UE and sends a second handover required message to a source MME of the remote UE; the source MME sends a mobility management context of the remote UE and a mobility management context of the relay UE to a target MME to which the target eNB belongs; the target MME receives a redirection request
(Continued)

message from the source MME; and sends information about the remote UE and information about the relay UE to the target eNB.

24 Claims, 18 Drawing Sheets

Related U.S. Application Data continuation of application No. PCT/CN2018/090696, filed on Jun. 11, 2018.

(51) Int. Cl.
*H04W 36/08* (2009.01)
*H04W 36/38* (2009.01)
*H04W 88/04* (2009.01)

(56) References Cited

U.S. PATENT DOCUMENTS

| | | | |
|---|---|---|---|
| 2014/0185585 A1* | 7/2014 | Zhang | H04W 36/0033 370/331 |
| 2014/0220936 A1 | 8/2014 | Turtinen et al. | |
| 2014/0226559 A1 | 8/2014 | Jactat et al. | |
| 2014/0286314 A1 | 9/2014 | Xu et al. | |
| 2020/0037218 A1 | 1/2020 | Karampatsis et al. | |
| 2020/0068380 A1* | 2/2020 | Wallentin | H04W 76/14 |

FOREIGN PATENT DOCUMENTS

| | | |
|---|---|---|
| CN | 104349402 A | 2/2015 |
| CN | 105050152 A | 11/2015 |
| CN | 106612528 A | 5/2017 |
| WO | 2017030572 A1 | 2/2017 |
| WO | 2017050195 A1 | 3/2017 |

OTHER PUBLICATIONS

R3-171958 Huawei, "TP for FeD2D Wearable Solutions",3GPP TSG-RAN3 Meeting #96,Hangzhou, China, 15 May 19, 2017, total 6 pages.

R3-171357 Huawei, "TP for FeD2D Solutions",3GPP TSG-RAN3 Meeting #95bis,Spokane, Washington, USA, 03 Apr. 7, 2017, total 6 pages.

3GPP TR 23.733 V1.0.0 (Jun. 2017),3rd Generation Partnership Project;Technical Specification Group Services and System Aspects;Study on Architecture Enhancements toProSe UE-to-Network Relay(Release 15), total pages.

* cited by examiner

HANDOVER METHOD, APPARATUS, AND SYSTEM

CROSS-REFERENCE TO RELATED APPLICATIONS

This application is a continuation of U.S. patent application Ser. No. 16/719,483, filed on Dec. 18, 2019, which is a continuation of International Application No. PCT/CN2018/090696, filed on Jun. 11, 2018, which claims priority to Chinese Patent Application No. 201710465053.4, filed on Jun. 19, 2017, the disclosures of which are incorporated herein by reference in their entireties.

TECHNICAL FIELD

This application relates to the communications field, and in particular, to a handover method, an apparatus, and a system.

BACKGROUND

In a long term evolution wearable (LTE-W) protocol, remote user equipment (UE) (for example, a wearable device (WD)) is connected to a cellular network by using relay user equipment. The remote user equipment is usually relatively close to the relay user equipment. Therefore, the remote user equipment may send and receive data at relatively low power by using the relay user equipment, and the power may be less than that consumed when the remote user equipment is directly connected to the cellular network. The remote UE establishes an S1 application protocol (S1-AP) signaling plane and an S1 user (S1-U) bearer data plane of the remote UE, but communicates with an evolved NodeB (eNB) by using a radio bearer of the relay UE.

In an existing evolved packet system (EPS) architecture, an eNB may obtain radio link information of UE, and hand over the UE based on the radio link information. In a wearable scenario, both the remote UE and the relay UE are movable. Therefore, a problem of handover of the relay UE or the remote UE between different eNBs may exist. However, how the remote UE and the relay UE are handed over in the wearable scenario is not disclosed in the prior art.

SUMMARY

Embodiments of this application provide a handover method, an apparatus, and a system, to hand over relay UE and remote UE between different eNBs.

To achieve the foregoing objective, the following technical solutions are used in the embodiments of this application.

According to a first aspect, a handover method is provided. The method includes: when remote user equipment (UE) communicates with a network side by using relay UE, determining, by a source evolved NodeB (eNB) serving both the remote UE and the relay UE based on a measurement report of the relay UE, to hand over the relay UE to a target eNB; and when a source mobility management entity (MME) of the remote UE is the same as a source MME of the relay UE, sending, by the source eNB, a first handover required message to the source MME of the relay UE, where the first handover required message includes identifier information of the relay UE and identifier information of the remote UE, and the first handover required message is used to instruct to hand over both the relay UE and the remote UE to the target eNB; or when a source MME of the remote UE is different from a source MME of the relay UE, sending, by the source eNB, a second handover required message to the source MME of the remote UE, where the second handover request includes identifier information of the relay UE, and the second handover required message is used to instruct to hand over the remote UE to the target eNB and associate the remote UE with relay UE corresponding to an identifier of the relay UE. According to the handover method provided in this embodiment of this application, the remote UE communicates with the network side by using the relay UE, the source eNB serving both the remote UE and the relay UE determines, based on the measurement report of the relay UE, to hand over the relay UE to the target eNB, and also needs to hand over the remote UE to the target eNB. In a manner, when the source MME of the remote UE is the same as the source MME of the relay UE, the source eNB sends the first handover required message to the source MME of the relay UE, where the first handover required message includes the identifier information of the relay UE and the identifier information of the remote UE, to instruct to hand over both the relay UE and the remote UE to the target eNB; or when the source MME of the remote UE is different from the source MME of the relay UE, the source eNB sends the second handover required message to the source MME of the remote UE, where the second handover request includes the identifier information of the relay UE, so that the remote UE is, after handed over to the target eNB, associated with the relay UE corresponding to the identifier of the relay UE. In one embodiment, there is no need to determine whether the source MMEs are the same. The source eNB sends the first handover required message to the source MME of the relay UE, where the first handover required message is used to instruct to hand over the relay UE to the target eNB; and the source eNB sends the second handover required message to the source MME of the remote UE, where the second handover request includes the identifier information of the relay UE, and the second handover required message is used to instruct to hand over the remote UE to the target eNB and associate the remote UE with the relay UE corresponding to the identifier of the relay UE. In one embodiment, the source MME sends a mobility management context of the remote UE and a mobility management context of the relay UE to a target MME to which the target eNB belongs, to hand over both the remote UE and the relay UE to the target eNB. In one embodiment, the source MME sends a redirection request message to a target MME to which the target eNB belongs, where the redirection request message includes a mobility management context of the remote UE and the identifier information of the relay UE, to hand over the remote UE to the target eNB and associate the remote UE with the relay UE. In one embodiment, the target MME sends information about the remote UE and information about the relay UE to the target eNB, to instruct to hand over both the relay UE and the remote UE to the target eNB and enable the target eNB to associate the remote UE with the relay UE. In one embodiment, the target MME sends a handover request message to the target eNB, where the handover request message includes information about the remote UE and the identifier information of the relay UE, and the handover request message is used to instruct to hand over the remote UE to the target eNB and associate the remote UE with the relay UE corresponding to the identifier information of the relay UE. S1 handover of both the remote UE and the relay UE between the eNBs is implemented by using the foregoing communication processes.

In one embodiment, the first handover required message includes group handover indication information, and the group handover indication information is used to instruct to hand over both the relay UE and the remote UE to the target eNB. Alternatively, a message header of the first handover required message includes a message type, and the message type is used to instruct to hand over both the relay UE and the remote UE to the target eNB. This embodiment provides a manner of instructing to hand over both the relay UE and the remote UE.

In one embodiment, the identifier information of the relay UE includes at least one of the following: a globally unique temporary UE identity (GUTI), a system architecture evolution (SAE)-temporary mobile subscriber identity (S-TMSI), an MME-temporary mobile subscriber identity (M-TMSI), and a UE S1 application protocol (S1-AP) identity. This embodiment provides an indication manner of the identifier information of the relay UE.

According to a second aspect, a handover method is provided. The method includes: when remote user equipment (UE) communicates with a network side by using relay UE, determining, by a source evolved NodeB (eNB) serving both the remote UE and the relay UE based on a measurement report of the relay user equipment UE, to hand over the relay UE to a target eNB; sending, by the source eNB, a first handover required message to a source MME of the relay UE, where the first handover required message is used to instruct to hand over the relay UE to the target eNB; and sending, by the source eNB, a second handover required message to a source MME of the remote UE, where the second handover request includes identifier information of the relay UE, and the second handover required message is used to instruct to hand over the remote UE to the target eNB and associate the remote UE with relay UE corresponding to an identifier of the relay UE. According to the handover method provided in this embodiment of this application, the remote UE communicates with the network side by using the relay UE, the source eNB serving both the remote UE and the relay UE determines, based on the measurement report of the relay UE, to hand over the relay UE to the target eNB, and also needs to hand over the remote UE to the target eNB. In one embodiment, when the source MME of the remote UE is the same as the source MME of the relay UE, the source eNB sends the first handover required message to the source MME of the relay UE, where the first handover required message includes the identifier information of the relay UE and identifier information of the remote UE, to instruct to hand over both the relay UE and the remote UE to the target eNB; or when the source MME of the remote UE is different from the source MME of the relay UE, the source eNB sends the second handover required message to the source MME of the remote UE, where the second handover request includes the identifier information of the relay UE, so that the remote UE is, after handed over to the target eNB, associated with the relay UE corresponding to the identifier of the relay UE. In one embodiment, there is no need to determine whether the source MMEs are the same. The source eNB sends the first handover required message to the source MME of the relay UE, where the first handover required message is used to instruct to hand over the relay UE to the target eNB; and the source eNB sends the second handover required message to the source MME of the remote UE, where the second handover request includes the identifier information of the relay UE, and the second handover required message is used to instruct to hand over the remote UE to the target eNB and associate the remote UE with the relay UE corresponding to the identifier of the relay UE. In one embodiment, the source MME sends a mobility management context of the remote UE and a mobility management context of the relay UE to a target MME to which the target eNB belongs, to hand over both the remote UE and the relay UE to the target eNB. In one embodiment, the source MME sends a redirection request message to a target MME to which the target eNB belongs, where the redirection request message includes a mobility management context of the remote UE and the identifier information of the relay UE, to hand over the remote UE to the target eNB and associate the remote UE with the relay UE. In one embodiment, the target MME sends information about the remote UE and information about the relay UE to the target eNB, to instruct to hand over both the relay UE and the remote UE to the target eNB and enable the target eNB to associate the remote UE with the relay UE. In one embodiment, the target MME sends a handover request message to the target eNB, where the handover request message includes information about the remote UE and the identifier information of the relay UE, and the handover request message is used to instruct to hand over the remote UE to the target eNB and associate the remote UE with the relay UE corresponding to the identifier information of the relay UE. S1 handover of both the remote UE and the relay UE between the eNBs is implemented by using the foregoing communication processes.

In one embodiment, the identifier information of the relay UE includes at least one of the following: a globally unique temporary UE identity (GUTI), a system architecture evolution (SAE)-temporary mobile subscriber identity (S-TMSI), an MME-temporary mobile subscriber identity (M-TMSI), and a UE S1 application protocol (S1-AP) identity. This embodiment provides an indication manner of the identifier information of the relay UE.

According to a third aspect, a handover method is provided. The method includes: receiving, by a source mobility management entity (MME), a handover required message from a source evolved NodeB (eNB) serving both relay user equipment (UE) and remote UE, where the remote UE communicates with a network side by using the relay UE, the handover request includes identifier information of the relay UE and identifier information of the remote UE, and the handover required message is used to instruct to hand over both the relay UE and the remote UE to a target eNB; and sending, by the source MME, a mobility management context of the remote UE and a mobility management context of the relay UE to a target MME to which the target eNB belongs, to hand over both the remote UE and the relay UE to the target eNB. According to the handover method provided in this embodiment of this application, the remote UE communicates with the network side by using the relay UE, the source eNB serving both the remote UE and the relay UE determines, based on a measurement report of the relay UE, to hand over the relay UE to the target eNB, and also needs to hand over the remote UE to the target eNB. In one embodiment, when a source MME of the remote UE is the same as a source MME of the relay UE, the source eNB sends a first handover required message to the source MME of the relay UE, where the first handover required message includes the identifier information of the relay UE and the identifier information of the remote UE, to instruct to hand over both the relay UE and the remote UE to the target eNB; or when a source MME of the remote UE is different from a source MME of the relay UE, the source eNB sends a second handover required message to the source MME of the remote UE, where the second handover request includes the identifier information of the relay UE, so that the remote UE is, after handed over to the target eNB, associated with relay UE corresponding to an identifier of the relay UE. In one embodiment, there is no need to determine whether source MMEs are the same. The source eNB sends a first handover required message to a source MME of the relay UE, where the first handover required message is used to instruct to hand over the relay UE to the target eNB; and the source eNB sends a second handover required message to a source MME of the remote UE, where the second handover request includes the identifier information of the relay UE, and the second handover required message is used to instruct to hand over the remote UE to the target eNB and associate the remote UE with relay UE corresponding to an identifier of the relay UE. In one embodiment, the source MME sends the mobility management context of the remote UE and the mobility management context of the relay UE to the target MME to which the target eNB belongs, to hand over both the remote UE and the relay UE to the target eNB. In one embodiment, the source MME sends a redirection request message to the target MME to which the target eNB belongs, where the redirection request message includes the mobility management context of the remote UE and the identifier information of the relay UE, to hand over the remote UE to the target eNB and associate the remote UE with the relay UE. In one embodiment, the target MME sends information about the remote UE and information about the relay UE to the target eNB, to instruct to hand over both the relay UE and the remote UE to the target eNB and enable the target eNB to associate the remote UE with the relay UE. In one embodiment, the target MME sends a handover request message to the target eNB, where the handover request message includes information about the remote UE and the identifier information of the relay UE, and the handover request message is used to instruct to hand over the remote UE to the target eNB and associate the remote UE with the relay UE corresponding to the identifier information of the relay UE. S1 handover of both the remote UE and the relay UE between the eNBs is implemented by using the foregoing communication processes.

In one embodiment, the sending, by the source MME, a mobility management context of the remote UE and a mobility management context of the relay UE to a target MME to which the target eNB belongs, to hand over both the remote UE and the relay UE to the target eNB includes: sending, by the source MME, a first redirection request message to the target MME, where the first redirection request message includes the mobility management context of the relay UE and the mobility management context of the remote UE, to hand over both the remote UE and the relay UE to the target eNB. This embodiment provides a manner of simultaneously sending the mobility management context of the relay UE and the mobility management context of the remote UE.

In one embodiment, the sending, by the source MME, a mobility management context of the remote UE and a mobility management context of the relay UE to a target MME to which the target eNB belongs, to hand over both the remote UE and the relay UE to the target eNB includes: sending, by a first source MME, a second redirection request message to the target MME, where the second redirection request message includes the mobility management context of the relay UE; and sending, by a second source MME, a third redirection request message to the target MME, where the third redirection request message includes the mobility management context of the remote UE and the identifier information of the relay UE, to hand over the remote UE to the target eNB and associate the remote UE with the relay UE corresponding to the identifier of the relay UE. The first source MME and the second source MME are a same MME or different MMEs. This embodiment provides a manner of separately sending the mobility management context of the relay UE and the mobility management context of the remote UE.

In one embodiment, the method further includes: obtaining, by the second source MME, second identifier information of the relay UE in the third redirection request message based on first identifier information of the relay UE in the handover required message. According to this embodiment, the identifier information of the relay UE may be directly transferred or indirectly obtained.

According to a fourth aspect, a handover method is provided. The method includes: receiving, by a source mobility management entity (MME), a handover required message from a source evolved NodeB (eNB) serving both relay user equipment (UE) and remote UE, where the remote UE communicates with a network side by using the relay UE, the handover request includes identifier information of the relay UE, the handover required message is used to instruct to hand over the remote UE to a target eNB and associate the remote UE with relay UE corresponding to an identifier of the relay UE, and the target eNB is an eNB to which the relay UE is to be handed over; and sending, by the source MME, a redirection request message to a target MME to which the target eNB belongs, where the redirection request message includes a mobility management context of the remote UE and the identifier information of the relay UE, to hand over the remote UE to the target eNB and associate the remote UE with the relay UE. According to the handover method provided in this embodiment of this application, the remote UE communicates with the network side by using the relay UE, the source eNB serving both the remote UE and the relay UE determines, based on a measurement report of the relay UE, to hand over the relay UE to the target eNB, and also needs to hand over the remote UE to the target eNB. In one embodiment, when a source MME of the remote UE is the same as a source MME of the relay UE, the source eNB sends a first handover required message to the source MME of the relay UE, where the first handover required message includes the identifier information of the relay UE and identifier information of the remote UE, to instruct to hand over both the relay UE and the remote UE to the target eNB; or when a source MME of the remote UE is different from a source MME of the relay UE, the source eNB sends a second handover required message to the source MME of the remote UE, where the second handover request includes the identifier information of the relay UE, so that the remote UE is, after handed over to the target eNB, associated with relay UE corresponding to an identifier of the relay UE. In one embodiment, there is no need to determine whether source MMEs are the same. The source eNB sends a first handover required message to a source MME of the relay UE, where the first handover required message is used to instruct to hand over the relay UE to the target eNB; and the source eNB sends a second handover required message to a source MME of the remote UE, where the second handover request includes the identifier information of the relay UE, and the second handover required message is used to instruct to hand over the remote UE to the target eNB and associate the remote UE with relay UE corresponding to an identifier of the relay UE. In one embodiment, the source MME sends the mobility management context of the remote UE and a mobility management context of the relay UE to the target MME to which the target eNB belongs, to hand over both the remote UE and the relay UE to the target eNB. In one embodiment, the source MME sends the redirection request message to the target MME to which the target eNB belongs, where the redirection request message includes the mobility management context of the remote UE and the identifier information of the relay UE, to hand over the remote UE to the target eNB and associate the remote UE with the relay UE. In one embodiment, the target MME sends information about the remote UE and information about the relay UE to the target eNB, to instruct to hand over both the relay UE and the remote UE to the target eNB and enable the target eNB to associate the remote UE with the relay UE. In one embodiment, the target MME sends a handover request message to the target eNB, where the handover request message includes information about the remote UE and the identifier information of the relay UE, and the handover request message is used to instruct to hand over the remote UE to the target eNB and associate the remote UE with the relay UE corresponding to the identifier information of the relay UE. S1 handover of both the remote UE and the relay UE between the eNBs is implemented by using the foregoing communication processes.

In one embodiment, the method further includes: obtaining, by the source MME, second identifier information of the relay UE in the redirection request message based on first identifier information of the relay UE in the handover required message. According to this embodiment, the identifier information of the relay UE may be directly transferred or indirectly obtained.

According to a fifth aspect, a handover method is provided. The method includes: receiving, by a target mobility management entity (MME), a redirection request message from a source MME, where the redirection request message includes a mobility management context of remote user equipment (UE) and a mobility management context of relay UE, to instruct to hand over both the relay UE and the remote UE to a target evolved NodeB (eNB), the remote UE communicates with a network side by using the relay UE, and the target MME is an MME to which the target eNB belongs; and sending, by the target MME, information about the remote UE and information about the relay UE to the target eNB, to instruct to hand over both the relay UE and the remote UE to the target eNB and enable the target eNB to associate the remote UE with the relay UE. According to the handover method provided in this embodiment of this application, the remote UE communicates with a network side by using the relay UE, a source eNB serving both the remote UE and the relay UE determines, based on a measurement report of the relay UE, to hand over the relay UE to the target eNB, and also needs to hand over the remote UE to the target eNB. In one embodiment, when a source MME of the remote UE is the same as a source MME of the relay UE, the source eNB sends a first handover required message to the source MME of the relay UE, where the first handover required message includes identifier information of the relay UE and identifier information of the remote UE, to instruct to hand over both the relay UE and the remote UE to the target eNB; or when a source MME of the remote UE is different from a source MME of the relay UE, the source eNB sends a second handover required message to the source MME of the remote UE, where the second handover request includes identifier information of the relay UE, so that the remote UE is, after handed over to the target eNB, associated with relay UE corresponding to an identifier of the relay UE. In one embodiment, there is no need to determine whether source MMEs are the same. The source eNB sends a first handover required message to a source MME of the relay UE, where the first handover required message is used to instruct to hand over the relay UE to the target eNB; and the source eNB sends a second handover required message to a source MME of the remote UE, where the second handover request includes identifier information of the relay UE, and the second handover required message is used to instruct to hand over the remote UE to the target eNB and associate the remote UE with relay UE corresponding to an identifier of the relay UE. In one embodiment, the source MME sends the mobility management context of the remote UE and the mobility management context of the relay UE to the target MME to which the target eNB belongs, to hand over both the remote UE and the relay UE to the target eNB. In one embodiment, the source MME sends the redirection request message to the target MME to which the target eNB belongs, where the redirection request message includes the mobility management context of the remote UE and the identifier information of the relay UE, to hand over the remote UE to the target eNB and associate the remote UE with the relay UE. In one embodiment, the target MME sends the information about the remote UE and the information about the relay UE to the target eNB, to instruct to hand over both the relay UE and the remote UE to the target eNB and enable the target eNB to associate the remote UE with the relay UE. In one embodiment, the target MME sends a handover request message to the target eNB, where the handover request message includes the information about the remote UE and the identifier information of the relay UE, and the handover request message is used to instruct to hand over the remote UE to the target eNB and associate the remote UE with the relay UE corresponding to the identifier information of the relay UE. S1 handover of both the remote UE and the relay UE between the eNBs is implemented by using the foregoing communication processes.

In one embodiment, the sending, by the target MME, information about the remote UE and information about the relay UE to the target eNB, to instruct to hand over both the relay UE and the remote UE to the target eNB and enable the target eNB to associate the remote UE with the relay UE includes: sending, by the target MME, a first handover request message to the target eNB, where the first handover request message includes the information about the remote UE and the information about the relay UE, and the first handover request message is used to instruct to hand over both the relay UE and the remote UE to the target eNB and enable the target eNB to associate the remote UE with the relay UE. This embodiment provides a manner of simultaneously sending the information about the remote UE and the information about the relay UE.

In one embodiment, the sending, by the target MME, information about the remote UE and information about the relay UE to the target eNB, to instruct to hand over both the relay UE and the remote UE to the target eNB and enable the target eNB to associate the remote UE with the relay UE includes: sending, by a first target MME, a second handover request message to the target eNB, where the second handover request message includes the information about the relay UE; and sending, by a second target MME, a third handover request message to the target eNB, where the third handover request message includes the information about the remote UE and the identifier information of the relay UE, and the third handover request message is used to instruct to hand over the remote UE to the target eNB and associate the remote UE with the relay UE corresponding to the identifier information of the relay UE. The first target MME and the second target MME are a same MME or different MMEs. This embodiment provides a manner of separately sending the information about the remote UE and the information about the relay UE.

According to a sixth aspect, a handover method is provided. The method includes: receiving, by a target mobility management entity (MME), a redirection request message from a source MME, where the redirection request message is used to instruct to hand over remote user equipment (UE) to a target evolved NodeB (eNB), the target eNB is an eNB to which relay UE is to be handed over, the remote UE communicates with a network side by using the relay UE, the target MME is an MME to which the target eNB belongs, and the redirection request message includes a mobility management context of the remote UE and identifier information of the relay UE; and sending, by the target MME, a handover request message to the target eNB, where the handover request message includes information about the remote UE and the identifier information of the relay UE, and the handover request message is used to instruct to hand over the remote UE to the target eNB and associate the remote UE with relay UE corresponding to the identifier information of the relay UE. According to the handover method provided in this embodiment of this application, the remote UE communicates with the network side by using the relay UE, a source eNB serving both the remote UE and the relay UE determines, based on a measurement report of the relay UE, to hand over the relay UE to the target eNB, and also needs to hand over the remote UE to the target eNB. In one embodiment, when a source MME of the remote UE is the same as a source MME of the relay UE, the source eNB sends a first handover required message to the source MME of the relay UE, where the first handover required message includes the identifier information of the relay UE and identifier information of the remote UE, to instruct to hand over both the relay UE and the remote UE to the target eNB; or when a source MME of the remote UE is different from a source MME of the relay UE, the source eNB sends a second handover required message to the source MME of the remote UE, where the second handover request includes the identifier information of the relay UE, so that the remote UE is, after handed over to the target eNB, associated with the relay UE corresponding to the identifier of the relay UE. In one embodiment, there is no need to determine whether source MMEs are the same. The source eNB sends a first handover required message to a source MME of the relay UE, where the first handover required message is used to instruct to hand over the relay UE to the target eNB; and the source eNB sends a second handover required message to a source MME of the remote UE, where the second handover request includes the identifier information of the relay UE, and the second handover required message is used to instruct to hand over the remote UE to the target eNB and associate the remote UE with the relay UE corresponding to the identifier of the relay UE. In one embodiment, the source MME sends the mobility management context of the remote UE and a mobility management context of the relay UE to the target MME to which the target eNB belongs, to hand over both the remote UE and the relay UE to the target eNB. In another manner, the source MME sends the redirection request message to the target MME to which the target eNB belongs, where the redirection request message includes the mobility management context of the remote UE and the identifier information of the relay UE, to hand over the remote UE to the target eNB and associate the remote UE with the relay UE. In one embodiment, the target MME sends the information about the remote UE and information about the relay UE to the target eNB, to instruct to hand over both the relay UE and the remote UE to the target eNB and enable the target eNB to associate the remote UE with the relay UE. In one embodiment, the target MME sends the handover request message to the target eNB, where the handover request message includes the information about the remote UE and the identifier information of the relay UE, and the handover request message is used to instruct to hand over the remote UE to the target eNB and associate the remote UE with the relay UE corresponding to the identifier information of the relay UE. S1 handover of both the remote UE and the relay UE between the eNBs is implemented by using the foregoing communication processes.

According to a seventh aspect, a source evolved NodeB (eNB) is provided. The source eNB includes: a determining unit, configured to: when remote user equipment (UE) communicates with a network side by using relay UE, determine, based on a measurement report of the relay UE, to hand over the relay UE to a target eNB, where the source eNB is an eNB serving both the remote UE and the relay UE; and a sending unit, configured to: when a source MME of the remote UE is the same as a source MME of the relay UE, send a first handover required message to the source MME of the relay UE, where the first handover required message includes identifier information of the relay UE and identifier information of the remote UE, and the first handover required message is used to instruct to hand over both the relay UE and the remote UE to the target eNB. The sending unit is further configured to: when the source MME of the remote UE is different from the source MME of the relay UE, send a second handover required message to the source MME of the remote UE, where the second handover request includes the identifier information of the relay UE, and the second handover required message is used to instruct to hand over the remote UE to the target eNB and associate the remote UE with relay UE corresponding to an identifier of the relay UE. Based on a same inventive concept, for a problem-resolving principle and beneficial effects of the apparatus, refer to the first aspect, the embodiments of the method of the first aspect, and the resulting beneficial effects. Therefore, for implementation of the apparatus, refer to the first aspect and the embodiments of the method of the first aspect. Details are not described herein again.

According to an eighth aspect, a source evolved NodeB (eNB) is provided. The source eNB includes: a determining unit, configured to: when remote user equipment (UE) communicates with a network side by using relay UE, determine, based on a measurement report of the relay user equipment UE, to hand over the relay UE to a target eNB, where the source eNB is an eNB serving both the remote UE and the relay UE; and a sending unit, configured to send a first handover required message to a source MME of the relay UE, where the first handover required message is used to instruct to hand over the relay UE to the target eNB. The sending unit is further configured to send a second handover required message to a source MME of the remote UE, where the second handover request includes identifier information of the relay UE, and the second handover required message is used to instruct to hand over the remote UE to the target eNB and associate the remote UE with relay UE corresponding to an identifier of the relay UE. Based on a same inventive concept, for a problem-resolving principle and beneficial effects of the apparatus, refer to the second aspect, the embodiments of the method of the second aspect, and the resulting beneficial effects. Therefore, for implementation of the apparatus, refer to the second aspect and the embodiments of the method of the second aspect. Details are not described herein again.

According to a ninth aspect, a source mobility management entity (MME) is provided. The source MME includes: a receiving unit, configured to receive a handover required message from a source evolved NodeB (eNB) serving both relay user equipment (UE) and remote UE, where the remote UE communicates with a network side by using the relay UE, the handover request includes identifier information of the relay UE and identifier information of the remote UE, and the handover required message is used to instruct to hand over both the relay UE and the remote UE to a target eNB; and a sending unit, configured to send a mobility management context of the remote UE and a mobility management context of the relay UE to a target MME to which the target eNB belongs, to hand over both the remote UE and the relay UE to the target eNB. Based on a same inventive concept, for a problem-resolving principle and beneficial effects of the apparatus, refer to the third aspect, the embodiments of the method of the third aspect, and the resulting beneficial effects. Therefore, for implementation of the apparatus, refer to the third aspect and the embodiments of the method of the third aspect. Details are not described herein again.

According to a tenth aspect, a source mobility management entity (MME) is provided. The source MME includes: a receiving unit, configured to receive a handover required message from a source evolved NodeB (eNB) serving both relay user equipment (UE) and remote UE, where the remote UE communicates with a network side by using the relay UE, the handover request includes identifier information of the relay UE, the handover required message is used to instruct to hand over the remote UE to a target eNB and associate the remote UE with relay UE corresponding to an identifier of the relay UE, and the target eNB is an eNB to which the relay UE is to be handed over; and a sending unit, configured to send a redirection request message to a target MME to which the target eNB belongs, where the redirection request message includes a mobility management context of the remote UE and the identifier information of the relay UE, to hand over the remote UE to the target eNB and associate the remote UE with the relay UE. Based on a same inventive concept, for a problem-resolving principle and beneficial effects of the apparatus, refer to the fourth aspect, the embodiments of the method of the fourth aspect, and the resulting beneficial effects. Therefore, for implementation of the apparatus, refer to the fourth aspect and the embodiments of the method of the fourth aspect. Details are not described herein again.

According to an eleventh aspect, a target mobility management entity (MME) is provided. The target MME includes: a receiving unit, configured to receive a redirection request message from a source MME, where the redirection request message includes a mobility management context of remote user equipment (UE) and a mobility management context of relay UE, to instruct to hand over both the relay UE and the remote UE to a target evolved NodeB (eNB), the remote UE communicates with a network side by using the relay UE, and the target MME is an MME to which the target eNB belongs; and a sending unit, configured to send information about the remote UE and information about the relay UE to the target eNB, to instruct to hand over both the relay UE and the remote UE to the target eNB and enable the target eNB to associate the remote UE with the relay UE. Based on a same inventive concept, for a problem-resolving principle and beneficial effects of the apparatus, refer to the fifth aspect, the embodiments of the method of the fifth aspect, and the resulting beneficial effects. Therefore, for implementation of the apparatus, refer to the fifth aspect and the embodiments of the method of the fifth aspect. Details are not described herein again.

According to a twelfth aspect, a target mobility management entity (MME) is provided. The target MME includes: a receiving unit, configured to receive a redirection request message from a source MME, where the redirection request message is used to instruct to hand over remote user equipment (UE) to a target evolved NodeB (eNB), the target eNB is an eNB to which relay UE is to be handed over, the remote UE communicates with a network side by using the relay UE, the target MME is an MME to which the target eNB belongs, and the redirection request message includes a mobility management context of the remote UE and identifier information of the relay UE; and a sending unit, configured to send a handover request message to the target eNB, where the handover request message includes information about the remote UE and the identifier information of the relay UE, and the handover request message is used to instruct to hand over the remote UE to the target eNB and associate the remote UE with relay UE corresponding to the identifier information of the relay UE. Based on a same inventive concept, for a problem-resolving principle and beneficial effects of the apparatus, refer to the sixth aspect, the embodiments of the method of the sixth aspect, and the resulting beneficial effects. Therefore, for implementation of the apparatus, refer to the sixth aspect and the embodiments of the method of the sixth aspect. Details are not described herein again.

According to a thirteenth aspect, a source evolved NodeB eNB is provided. The source eNB includes: a processor, a memory, a bus, and a communications interface. The memory is configured to store a computer executable instruction. The processor is connected to the memory via the bus. When the source eNB runs, the processor executes the computer executable instruction stored in the memory, so that the source eNB performs the method according to any one of the first aspect and the embodiments of the first aspect, or performs the method according to any one of the second aspect and the embodiments of the second aspect.

According to a fourteenth aspect, a source mobility management entity MME is provided. The source MME includes: a processor, a memory, a bus, and a communications interface. The memory is configured to store a computer executable instruction. The processor is connected to the memory via the bus. When the source MME runs, the processor executes the computer executable instruction stored in the memory, so that the source MME performs the method according to any one of the third aspect and the embodiments of the third aspect, or performs the method according to any one of the fourth aspect and the embodiments of the fourth aspect.

According to a fifteenth aspect, a target mobility management entity MME is provided. The target MME includes: a processor, a memory, a bus, and a communications interface. The memory is configured to store a computer executable instruction. The processor is connected to the memory via the bus. When the target MME runs, the processor executes the computer executable instruction stored in the memory, so that the target MME performs the method according to any one of the fifth aspect and the embodiments of the fifth aspect, or performs the method according to any one of the sixth aspect and the embodiments of the sixth aspect.

According to a sixteenth aspect, a computer storage medium is provided. The computer storage medium includes an instruction, and when the instruction is run on a computer, the computer is enabled to perform the method according to any one of the first aspect and the embodiments of the first aspect, or to perform the method according to any one of the second aspect and the embodiments of the second aspect.

According to a seventeenth aspect, a computer storage medium is provided. The computer storage medium includes an instruction, and when the instruction is run on a computer, the computer is enabled to perform the method according to any one of the third aspect and the embodiments of the third aspect, or to perform the method according to any one of the fourth aspect and the embodiments of the fourth aspect.

According to an eighteenth aspect, a computer storage medium is provided. The computer storage medium includes an instruction, and when the instruction is run on a computer, the computer is enabled to perform the method according to any one of the fifth aspect and the embodiments of the fifth aspect, or to perform the method according to any one of the sixth aspect and the embodiments of the sixth aspect.

According to a nineteenth aspect, a computer program product including an instruction is provided. When the computer program product is run on a computer, the computer is enabled to perform the method according to any one of the first aspect and the embodiments of the first aspect, or to perform the method according to any one of the second aspect and the embodiments of the second aspect.

According to a twentieth aspect, a computer program product including an instruction is provided. When the computer program product is run on a computer, the computer is enabled to perform the method according to any one of the third aspect and the embodiments of the third aspect, or to perform the method according to any one of the fourth aspect and the embodiments of the fourth aspect.

According to a twenty-first aspect, a computer program product including an instruction is provided. When the computer program product is run on a computer, the computer is enabled to perform the method according to any one of the fifth aspect and the embodiments of the fifth aspect, or to perform the method according to any one of the sixth aspect and the embodiments of the sixth aspect.

According to a twenty-second aspect, a communications system is provided. The communications system includes the source evolved NodeB (eNB) according to the seventh aspect or the source eNB according to the eighth aspect, the source mobility management entity (MME) according to the ninth aspect or the source MME according to the tenth aspect, and the target (MME) according to the eleventh aspect or the target MME according to the twelfth aspect; or includes the source eNB according to the thirteenth aspect, the source MME according to the fourteenth aspect, and the target MME according to the fifteenth aspect.

It should be noted that, for technical effects brought in the thirteenth aspect to the twenty-second aspect, refer to the technical effects brought by corresponding methods. Details are not described herein again.

According to a twenty-third aspect, a handover method is provided. The method includes: determining, by a source evolved NodeB (eNB) based on a measurement report of relay user equipment (relay UE) and depending on whether there is remote user equipment (remote UE) communicating with the source eNB by using the relay UE, whether to hand over both the relay UE and the remote UE to a target eNB; when determining to hand over both the relay UE and the remote UE to the target eNB, sending, by the source eNB, handover information of the relay UE and handover information of the remote UE to the target eNB, to initiate handover to the target eNB, where the handover information of the relay UE includes a context of the relay UE, and the handover information of the remote UE includes a context of the remote UE; receiving, by the source eNB, first access information and second access information from the target eNB, where the first access information is obtained by the target eNB based on the handover information of the relay UE, so that the relay UE is handed over and accesses the target eNB, and the second access information is obtained by the target eNB based on the handover information of the remote UE, so that the remote UE is handed over and accesses the target eNB by using the relay UE; sending, by the source eNB, the first access information and the second access information to the relay UE, so that the relay UE forwards the second access information to the remote UE; receiving, by the source eNB, release indication information from the target eNB, where the release indication information is used to instruct the source eNB to release the context of the relay UE and the context of the remote UE; and releasing, by the source eNB, the context of the relay UE and the context of the remote UE according to the release indication information. According to the handover method provided in this embodiment of this application, when the source eNB initiates to hand over both the remote UE and the relay UE to the target eNB, the handover information of the remote UE and the handover information of the relay UE are carried, and include the context of the remote UE and the context of the relay UE. The target eNB obtains the access information of the remote UE and the access information of the relay UE based on the handover information of the remote UE and the handover information of the relay UE, and the source eNB forwards the access information to the remote UE and the relay UE, so that the remote UE and the relay UE access the target eNB based on respective access information. After the remote UE and the relay UE are successfully handed over and access a target eNB, the target eNB instructs the source eNB to release the context of the remote UE and the context of the relay UE. The context of the remote UE and the context of the relay UE are transferred from the source eNB to the target eNB, and the remote UE and the relay UE successfully access the target eNB. Therefore, the remote UE and the relay UE are both handed over in a wearable scenario.

In one embodiment, the sending, by the source eNB, handover information of the relay UE and handover information of the remote UE to the target eNB includes: sending, by the source eNB, a first handover request message to the target eNB, where the first handover request message includes the handover information of the relay UE and the handover information of the remote UE. This embodiment provides a manner of simultaneously sending the handover information of the relay UE and the handover information of the remote UE.

In one embodiment, the sending, by the source eNB, handover information of the relay UE and handover information of the remote UE to the target eNB includes: sending, by the source eNB, a second handover request message to the target eNB, where the second handover request message includes the handover information of the relay UE; and sending, by the source eNB, a third handover request message to the target eNB, where the third handover request message includes the handover information of the remote UE. This embodiment provides a manner of separately sending the handover information of the relay UE and the handover information of the remote UE.

In one embodiment, the handover request message further includes an indication information information-element, and the indication information information-element is used to instruct to hand over both the relay UE and the remote UE. This embodiment provides a manner of instructing to hand over both the relay UE and the remote UE.

In one embodiment, a message type in a message header of the handover request message is used to instruct to hand over both the relay UE and the remote UE. This embodiment provides another manner of instructing to hand over both the relay UE and the remote UE.

In one embodiment, the sending, by the source eNB, the first access information and the second access information to the relay UE, so that the relay UE forwards the second access information to the remote UE includes: sending, by the source eNB, a first radio resource control (RRC) connection reconfiguration message to the relay UE, so that the relay UE forwards the second access information to the remote UE, where the first RRC connection reconfiguration message includes the first access information and the second access information. This embodiment provides a manner of simultaneously sending the access information of the relay UE and the access information of the remote UE.

In one embodiment, the sending, by the source eNB, the first access information and the second access information to the relay UE, so that the relay UE forwards the second access information to the remote UE includes: sending, by the source eNB, a second RRC connection reconfiguration message to the relay UE, where the second RRC connection reconfiguration message includes the first access information; and sending, by the source eNB, a third RRC connection reconfiguration message to the relay UE, so that the relay UE forwards the second access information to the remote UE, where the third RRC connection reconfiguration message includes the second access information. This embodiment provides a manner of separately sending the access information of the relay UE and the access information of the remote UE.

In one embodiment, the release indication information includes an identifier of the relay UE, and the releasing, by the source eNB, the context of the relay UE and the context of the remote UE according to the release indication information includes: releasing, by the source eNB, the context of the relay UE based on the identifier of the relay UE; obtaining, by the source eNB, an identifier of the remote UE based on the identifier of the relay UE and an association relationship between the relay UE and the remote UE; and releasing, by the source eNB, the context of the remote UE based on the identifier of the remote UE. This embodiment provides a specific manner of releasing the context of the UE.

In one embodiment, the release indication information includes an identifier of the relay UE and an identifier of the remote UE, and the releasing, by the source eNB, the context of the relay UE and the context of the remote UE according to the release indication information includes: releasing, by the source eNB, the context of the relay UE based on the identifier of the relay UE; and releasing, by the source eNB, the context of the remote UE based on the identifier of the remote UE. This embodiment provides a specific manner of releasing the context of the UE.

In one embodiment, the handover information further includes an association relationship between the relay UE and the remote UE. This one embodiment provides a specific form of the handover information.

In one embodiment, the handover information further includes an identifier of the relay UE and an identifier of the remote UE. This embodiment provides a specific manner of the handover information.

In one embodiment, the context of the relay UE and/or the context of the remote UE includes an association relationship between the relay UE and the remote UE. This embodiment provides a specific manner of the context of the relay UE and/or the context of the remote UE.

In one embodiment, the context of the relay UE includes an identifier of the relay UE, and the context of the remote UE includes an identifier of the remote UE. This embodiment provides a specific manner of the context of the relay UE and/or the context of the remote UE.

According to a twenty-fourth aspect, a handover method is provided. The method includes: receiving, by a target evolved NodeB (eNB), handover information of relay user equipment (relay UE) and handover information of remote user equipment (remote UE) from a source eNB, to determine whether the relay UE and the remote UE are both allowed to be handed over from the source eNB to the target eNB, where the remote UE communicates with the source eNB by using the relay UE, the handover information of the relay UE includes a context of the relay UE, and the handover information of the remote UE includes a context of the remote UE; when determining that the relay UE and the remote UE are both allowed to be handed over, obtaining, by the target eNB, first access information based on the handover information of the relay UE, so that the relay UE is handed over and accesses the target eNB; obtaining second access information based on the handover information of the remote UE, so that the remote UE is handed over and accesses the target eNB by using the relay UE; sending, by the target eNB, the first access information and the second access information to the source eNB, so that the source eNB forwards the first access information to the relay UE and forwards the second access information to the remote UE; receiving, by the target eNB, a handover success indication of the relay UE and a handover success indication of the remote UE, where the handover success indication of the relay UE is used to indicate that the relay UE is successfully handed over and accesses the target eNB, and the handover success indication of the remote UE is used to indicate that the remote UE is successfully handed over and accesses the target eNB by using the relay UE; starting, by the target eNB, path switch procedures for the relay UE and the remote UE; and sending, by the target eNB, release indication information to the source eNB after determining that the relay UE and the remote UE complete the path switch procedures, where the release indication information is used to instruct the source eNB to release the context of the relay UE and the context of the remote UE. According to the handover method provided in this embodiment of this application, when the source eNB initiates to hand over both the remote UE and the relay UE to the target eNB, the handover information of the remote UE and the handover information of the relay UE are carried, and include the context of the remote UE and the context of the relay UE. The target eNB obtains the access information of the remote UE and the access information of the relay UE based on the handover information of the remote UE and the handover information of the relay UE, and the source eNB forwards the access information to the remote UE and the relay UE, so that the remote UE and the relay UE access a target eNB based on respective access information. After the remote UE and the relay UE are successfully handed over and access the target eNB, the target eNB instructs the source eNB to release the context of the remote UE and the context of the relay UE. The context of the remote UE and the context of the relay UE are transferred from the source eNB to the target eNB, and the remote UE and the relay UE successfully access the target eNB. Therefore, the remote UE and the relay UE are both handed over in a wearable scenario.

In one embodiment, the receiving, by a target evolved NodeB (eNB), handover information of relay user equipment (relay UE) and handover information of remote user equipment (remote UE) from a source eNB includes: receiving, by the target eNB, a first handover request message from the source eNB, where the first handover request message includes the handover information of the relay UE and the handover information of the remote UE. This embodiment provides a manner of simultaneously sending the handover information of the relay UE and the handover information of the remote UE.

In one embodiment, the receiving, by a target evolved NodeB (eNB), handover information of relay user equipment (relay UE) and handover information of remote user equipment (remote UE) from a source eNB includes: receiving, by the target eNB, a second handover request message from the source eNB, where the second handover request message includes the handover information of the relay UE; and receiving, by the target eNB, a third handover request message from the source eNB, where the third handover request message includes the handover information of the remote UE. This embodiment provides a manner of separately sending the handover information of the relay UE and the handover information of the remote UE.

In one embodiment, the handover request message further includes handover type indication information, and the handover type indication information is used to instruct to hand over both the relay UE and the remote UE. This embodiment provides a manner of instructing to hand over both the relay UE and the remote UE.

In one embodiment, a message type in a message header of the handover request message is used to instruct to hand over both the relay UE and the remote UE. This embodiment provides another manner of instructing to hand over both the relay UE and the remote UE.

In one embodiment, the sending, by the target eNB, the first access information and the second access information to the source eNB includes: sending, by the target eNB, a first handover request acknowledgment message to the source eNB, where the first handover request acknowledgment message includes the first access information and the second access information. This embodiment provides a manner of simultaneously sending the access information of the relay UE and the access information of the remote UE.

In one embodiment, the sending, by the target eNB, the first access information and the second access information to the source eNB includes: sending, by the target eNB, a second handover request acknowledgment message to the source eNB, where the second handover request acknowledgment message includes the first access information; and sending, by the target eNB, a third handover request acknowledgment message to the source eNB, where the third handover request acknowledgment message includes the second access information. This embodiment provides a manner of separately sending the access information of the relay UE and the access information of the remote UE.

In one embodiment, the release indication information includes an identifier of the relay UE, so that the source eNB releases the context of the relay UE based on the identifier of the relay UE, obtains an identifier of the remote UE based on the identifier of the relay UE and an association relationship between the relay UE and the remote UE, and releases the context of the remote UE based on the identifier of the remote UE. This embodiment provides a specific manner of releasing the context of the UE.

In one embodiment, the release indication information includes an identifier of the relay UE and an identifier of the remote UE, so that the source eNB releases the context of the relay UE based on the identifier of the relay UE, and releases the context of the remote UE based on the identifier of the remote UE. This embodiment provides a specific manner of releasing the context of the UE.

In one embodiment, the receiving, by the target eNB, a handover success indication of the relay UE and a handover success indication of the remote UE from the relay UE includes: receiving, by the target eNB, a first RRC connection reconfiguration complete message from the relay UE, where the first RRC connection reconfiguration complete message includes the handover success indication of the relay UE and the handover success indication of the remote UE. This embodiment provides a manner of simultaneously sending by the relay UE and receiving by the target eNB the handover success indication of the relay UE and the handover success information of the relay UE.

In one embodiment, the receiving, by the target eNB, a handover success indication of the relay UE and a handover success indication of the remote UE from the relay UE includes: receiving, by the target eNB, a second RRC connection reconfiguration complete message from the relay UE, where the second RRC connection reconfiguration complete message includes the handover success indication of the relay UE; and receiving, by the target eNB, a third RRC connection reconfiguration complete message from the relay UE, where the third RRC connection reconfiguration complete message includes the handover success indication of the remote UE, and the handover success indication of the remote UE is sent by the remote UE to the relay UE. This embodiment provides a manner of separately sending by the relay UE and receiving by the target eNB the handover success indication of the relay UE and the handover success information of the relay UE.

In one embodiment, the handover information further includes an association relationship between the relay UE and the remote UE. This embodiment provides a specific manner of the handover information.

In one embodiment, the handover information further includes an identifier of the relay UE and an identifier of the remote UE. This embodiment provides a specific manner of the handover information.

In one embodiment, the context of the relay UE and/or the context of the remote UE includes an association relationship between the relay UE and the remote UE. This embodiment provides a specific manner of the context of the relay UE and/or the context of the remote UE.

In one embodiment, the context of the relay UE includes an identifier of the relay UE, and the context of the remote UE includes an identifier of the remote UE. This embodiment provides a specific manner of the context of the relay UE and/or the context of the remote UE.

According to a twenty-fifth aspect, a source evolved NodeB (eNB) is provided. The source eNB includes: a determining unit, a sending unit, a receiving unit, and a release unit. The determining unit is configured to determine, based on a measurement report of relay user equipment (relay UE) and depending on whether there is remote user equipment (remote UE) communicating with the source eNB by using the relay UE, whether to hand over both the relay UE and the remote user equipment remote UE to a target eNB. The sending unit is configured to: when it is determined to hand over both the relay UE and the remote UE, send handover information of the relay UE and handover information of the remote UE to the target eNB, to initiate handover to the target eNB, where the handover information of the relay UE includes a context of the relay UE, and the handover information of the remote UE includes a context of the remote UE. The receiving unit is configured to receive first access information and second access information from the target eNB, where the first access information is obtained by the target eNB based on the handover information of the relay UE, so that the relay UE is handed over and accesses the target eNB, and the second access information is obtained by the target eNB based on the handover information of the remote UE, so that the remote UE is handed over and accesses the target eNB by using the relay UE. The sending unit is configured to send the first access information and the second access information to the relay UE, so that the relay UE forwards the second access information to the remote UE. The source eNB receives release indication information from the target eNB, where the release indication information is used to instruct the source eNB to release the context of the relay UE and the context of the remote UE. The release unit is configured to release the context of the relay UE and the context of the remote UE according to the release indication information. Based on a same inventive concept, for a problem-resolving principle and beneficial effects of the apparatus, refer to the twenty-third aspect, the embodiments of the method of the twenty-third aspect, and the resulting beneficial effects. Therefore, for implementation of the apparatus, refer to the twenty-third aspect and the embodiments of the method of the twenty-third aspect. Details are not described herein again.

According to a twenty-sixth aspect, a target evolved NodeB (eNB) is provided. The target eNB includes: a receiving unit, an obtaining unit, and a sending unit. The receiving unit is configured to receive handover information of relay user equipment (relay UE) and handover information of remote user equipment (remote UE) from a source eNB, to determine whether the relay UE and the remote UE are both allowed to be handed over from the source eNB to the target eNB, where the remote UE communicates with the source eNB by using the relay UE, the handover information of the relay UE includes a context of the relay UE, and the handover information of the remote UE includes a context of the remote UE. The obtaining unit is configured to: when it is determined that the relay UE and the remote UE are both allowed to be handed over, obtain first access information based on the handover information of the relay UE, so that the relay UE is handed over and accesses the target eNB. The obtaining unit is further configured to obtain second access information based on the handover information of the remote UE, so that the remote UE is handed over and accesses the target eNB by using the relay UE. The sending unit is configured to send the first access information and the second access information to the source eNB, so that the source eNB forwards the first access information to the relay UE and forwards the second access information to the remote UE. The receiving unit is further configured to receive a handover success indication of the relay UE and a handover success indication of the remote UE, where the handover success indication of the relay UE is used to indicate that the relay UE is successfully handed over and accesses the target eNB, and the handover success indication of the remote UE is used to indicate that the remote UE is successfully handed over and accesses the target eNB by using the relay UE. The sending unit is further configured to start path switch procedures for the relay UE and the remote UE. The sending unit is further configured to send release indication information to the source eNB after it is determined that the relay UE and the remote UE complete the path switch procedures, where the release indication information is used to instruct the source eNB to release the context of the relay UE and the context of the remote UE. Based on a same inventive concept, for a problem-resolving principle and beneficial effects of the apparatus, refer to the twenty-fourth aspect, the embodiments of the method of the twenty-fourth aspect, and the resulting beneficial effects. Therefore, for implementation of the apparatus, refer to the twenty-fourth aspect and the embodiments of the method of the twenty-fourth aspect. Details are not described herein again.

According to a twenty-seventh aspect, a source evolved NodeB (eNB) is provided. The source eNB includes: a processor, a memory, a bus, and a communications interface. The memory is configured to store a computer executable instruction. The processor is connected to the memory via the bus. When the source eNB runs, the processor executes the computer executable instruction stored in the memory, so that the source eNB performs the method according to any one of the twenty-third aspect and the embodiments of the twenty-third aspect.

According to a twenty-eighth aspect, a target evolved NodeB eNB is provided. The target eNB includes: a processor, a memory, a bus, and a communications interface. The memory is configured to store a computer executable instruction. The processor is connected to the memory via the bus. When the target eNB runs, the processor executes the computer executable instruction stored in the memory, so that the target eNB performs the method according to any one of the twenty-fourth aspect and the embodiments of the twenty-fourth aspect.

According to a twenty-ninth aspect, a computer storage medium is provided. The computer storage medium includes an instruction, and when the instruction is run on a computer, the computer is enabled to perform the method according to any one of the twenty-third aspect and the embodiments of the twenty-third aspect.

According to a thirtieth aspect, a computer storage medium is provided. The computer storage medium includes an instruction, and when the instruction is run on a computer, the computer is enabled to perform the method according to any one of the twenty-fourth aspect and the embodiments of the twenty-fourth aspect.

According to a thirty-first aspect, a computer program product including an instruction is provided. When the computer program product is run on a computer, the computer is enabled to perform the method according to any one of the twenty-third aspect and the embodiments of the twenty-third aspect.

According to a thirty-second aspect, a computer program product including an instruction is provided. When the computer program product is run on a computer, the computer is enabled to perform the method according to any one of the twenty-fourth aspect and the embodiments of the twenty-fourth aspect.

According to a thirty-third aspect, a communications system is provided. The communications system includes the source evolved NodeB (eNB) according to the twenty-fifth aspect and the target eNB according to the twenty-sixth aspect, or includes the source eNB according to the twenty-seventh aspect and the target eNB according to the twenty-eighth aspect.

It should be noted that, for technical effects brought in the twenty-seventh aspect to the thirty-third aspect, refer to the technical effects brought by corresponding methods. Details are not described herein again.

BRIEF DESCRIPTION OF DRAWINGS

To describe the technical solutions in the embodiments of this application more clearly, the following briefly describes the accompanying drawings used in conjunction with the detailed description for describing the embodiments.

DESCRIPTION OF EMBODIMENTS

Figure 1:
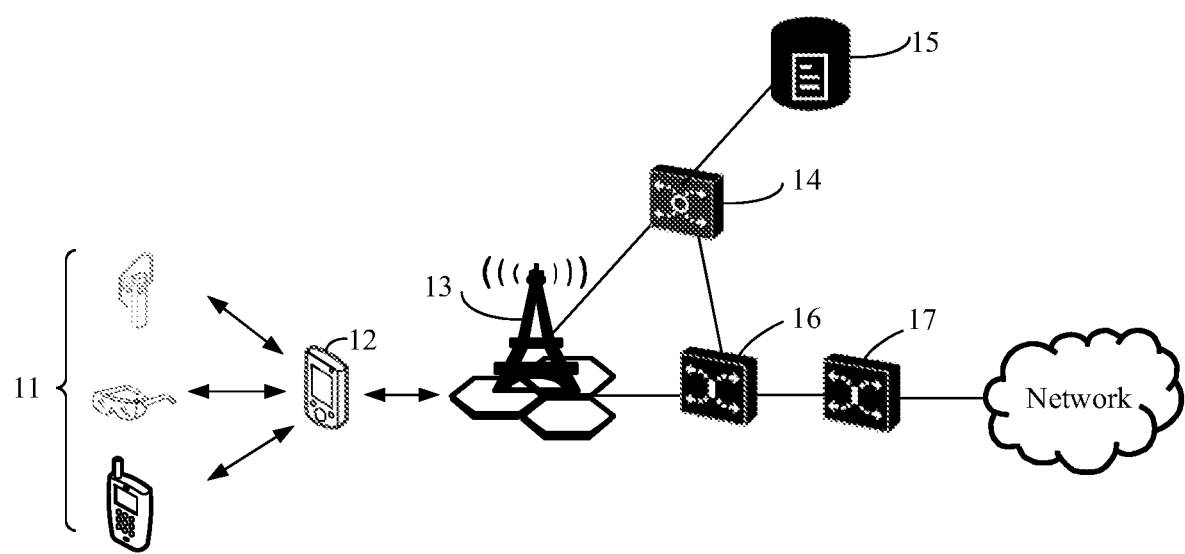
FIG. 1 is an overall structural diagram of a communications system according to an embodiment of this application.

The following describes the embodiments of this application with reference to the accompanying drawings.

In addition, this application describes each aspect with reference to a wireless network device. The wireless network device may be a base station. The base station may be configured to communicate with one or more user equipment, or may be configured to communicate with one or more base stations having some functions of user equipment (for example, communication between a macro base station and a micro base station such as an access point). Alternatively, the wireless network device may be user equipment. The user equipment may be configured to communicate with one or more user equipment (for example, D2D communication), or may be configured to communicate with one or more base stations. The user equipment may also be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless phone, a session initiation protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device configured to communicate in a wireless system. The base station may also be referred to as an access point, a node, a NodeB, an evolved NodeB, or another network entity, and may include some or all functions of the foregoing network entities. The base station may communicate with a wireless terminal by using an air interface. The communication may be performed by using one or more sectors. The base station may convert a received air interface frame into an Internet protocol (IP) packet, to use the IP packet as a router between the wireless terminal and a remaining part of an access network. The access network includes an IP network. The base station may further coordinate attribute management of the air interface, and may alternatively be a gateway between a wired network and a wireless network.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

The embodiments of this application may be applied to a time division duplex (TDD) scenario, and may also be applied to a frequency division duplex (FDD) scenario.

An embodiment of this application provides a handover system. Referring to FIG. 1, the handover system includes: remote UE 11, relay UE 12, an eNB 13, a mobility management entity (MME) 14, a home subscriber server (HSS) 15, a serving gateway (S-GW) 16, and a packet data network gateway (P-GW) 17. The MME 14, the HSS 15, the S-GW 16, the P-GW 17, and the like are core network devices. The remote UE 11 and the relay UE 12 are UEs, and the relay UE 12 communicates with the eNB 13 by using a radio link. The remote UE 11 does not directly communicate with the eNB 13; but indirectly communicates with the eNB 13 by using the relay UE 12, and further communicates with the core network device.

Figure 2:
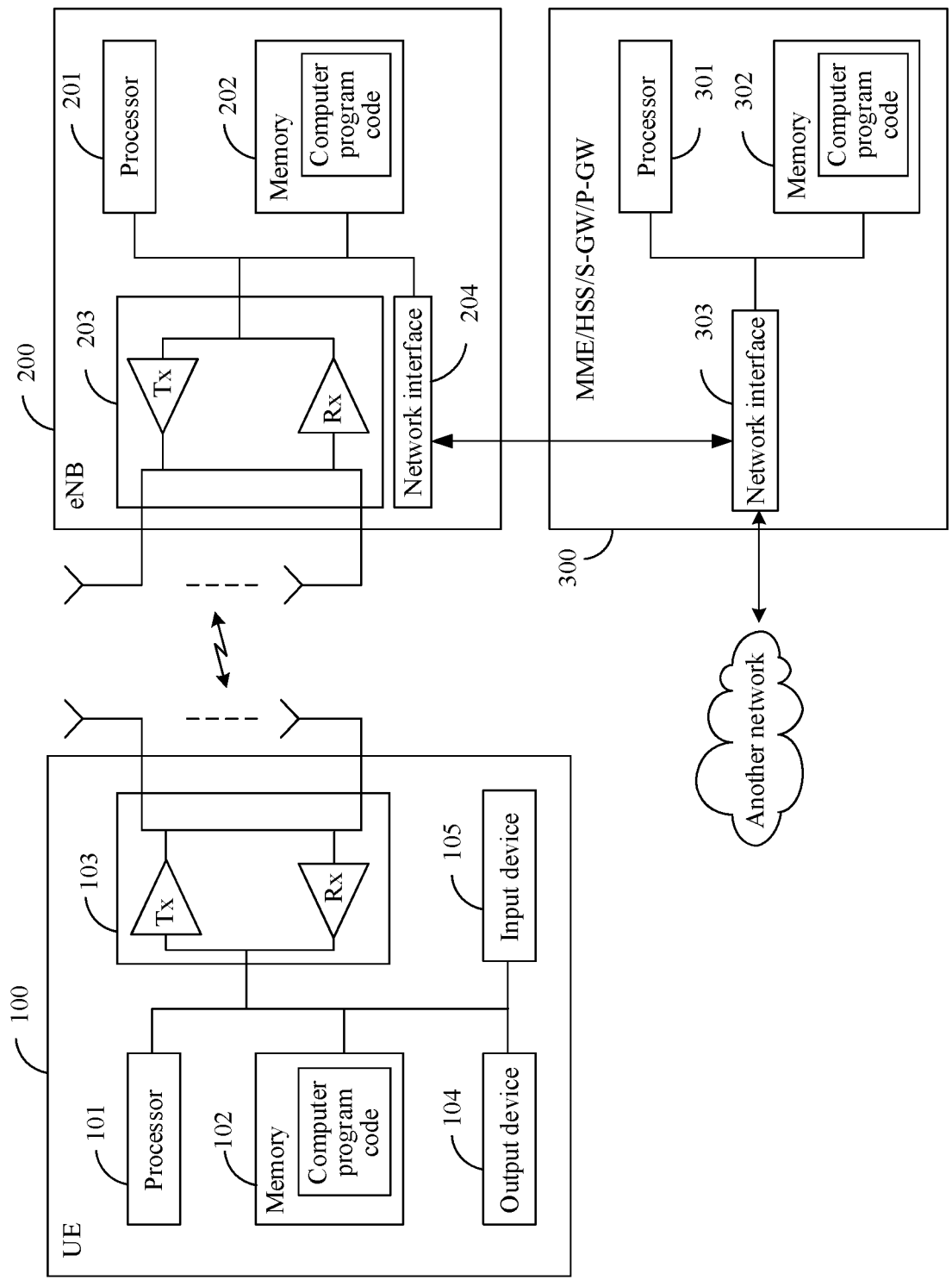
FIG. 2 is a structural diagram of hardware of a communications system according to an embodiment of this application.

FIG. 2 is a structural diagram of hardware of devices according to an embodiment of this application. UE 100 includes at least one processor 101, at least one memory 102, and at least one transceiver 103. Optionally, the UE 100 may further include an output device 104 and an input device 105.

The processor 101, the memory 102, and the transceiver 103 are connected via a bus. The processor 101 may be a general-purpose central processing unit (CPU), a microprocessor, an application-specific integrated circuit (ASIC)), or one or more integrated circuits configured to control program execution in the solutions of this application. The processor 101 may alternatively be a plurality of processors, and each processor may be a single-core (single-CPU) processor or a multi-core (multi-CPU) processor. The processors herein may be one or more devices, circuits, and/or processing cores configured to process data (for example, a computer program instruction).

The memory 102 may be a read-only memory (ROM) or another type of static storage device that may store static information and instructions, a random access memory (RAM) or another type of dynamic storage device that may store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile optical disc, a blue optical disc, or the like), a magnetic disk storage medium or another magnetic storage device, or any other medium that can carry or store expected program code in a form of an instruction or a data structure and can be accessed by a computer. However, this is not limited thereto. The memory 102 may exist independently, and is connected to the processor 101 via the bus. Alternatively, the memory 102 may be integrated with the processor 101. The memory 102 is configured to store application program code for executing the solutions of this application, and the application program code is executed under control of the processor 101. The processor 101 is configured to execute the computer program code stored in the memory 102, to implement the method in the embodiments of this application.

The transceiver 103 may use any apparatus of a transceiver type, and is configured to communicate with another device or a communications network such as the Ethernet, a radio access network (RAN), or a wireless local area network (WLAN). The transceiver 103 includes a transmitter Tx and a receiver Rx.

The output device 104 communicates with the processor 101, and may display information in a plurality of manners. For example, the output device 104 may be a liquid crystal display (LCD), a light emitting diode (LED) display device, a cathode ray tube (CRT) display device, or a projector. The input device 105 communicates with the processor 101, and may receive user input in a plurality of manners. For example, the input device 105 may be a mouse, a keyboard, a touchscreen device, or a sensing device.

An eNB 200 includes at least one processor 201, at least one memory 202, at least one transceiver 203, and at least one network interface 204. The network interface 204 is configured to connect to a network interface 303 of a core network device 300 by using a link (for example, an S1 interface), or connect to a network interface 204 of another eNB by using a wired or wireless link (for example, an X2 interface). For functions of the components in the eNB 200, refer to the function descriptions of the components in the UE 100. Details are not described herein again.

The core network device 300 may further provide a network connection, such as a telephone network and/or a data communications network (such as the Internet). The core network device 300 includes at least one processor 301, at least one memory 302, and at least one network interface 303. For functions of the components in the core network device 300, refer to the function descriptions of the components in the UE 100. Details are not described herein again.

Figure 3:
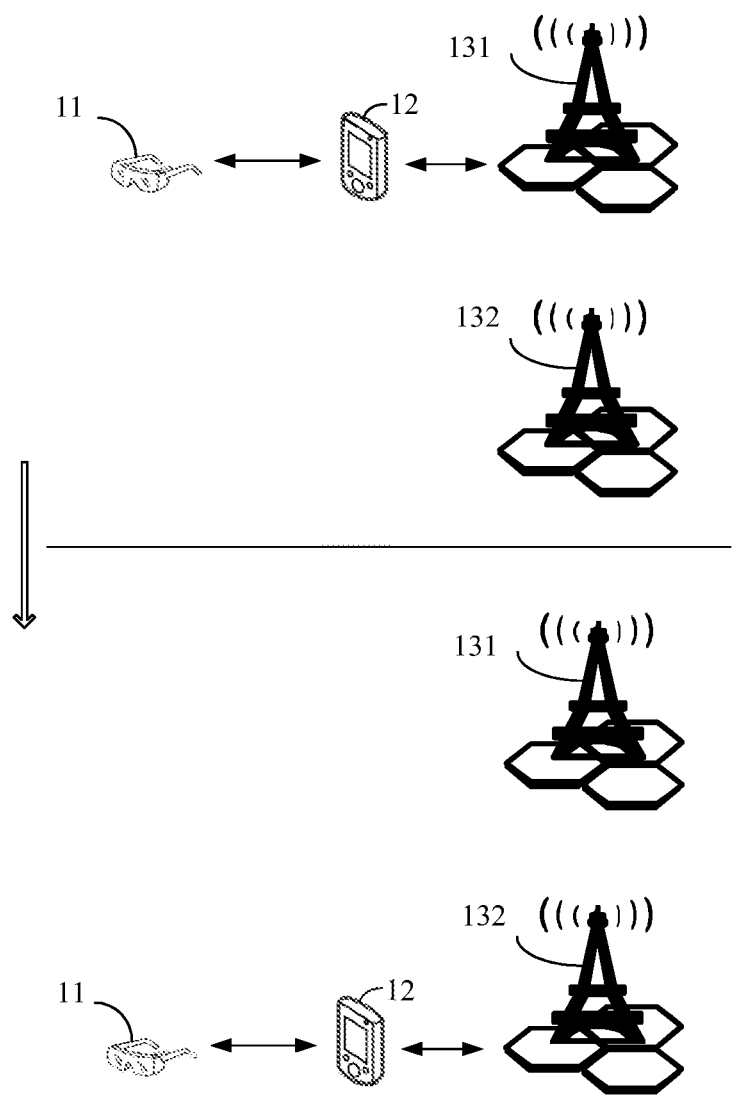
FIG. 3 is a diagram of a scenario in which remote UE and relay UE are both handed over according to an embodiment of this application.

A handover method, an apparatus, and a system that are provided in the embodiments of this application are mainly specific to a scenario shown in FIG. 3 in which both remote UE 11 and relay UE 12 are handed over from a source eNB 131 to a target eNB 132.

Figure 4:
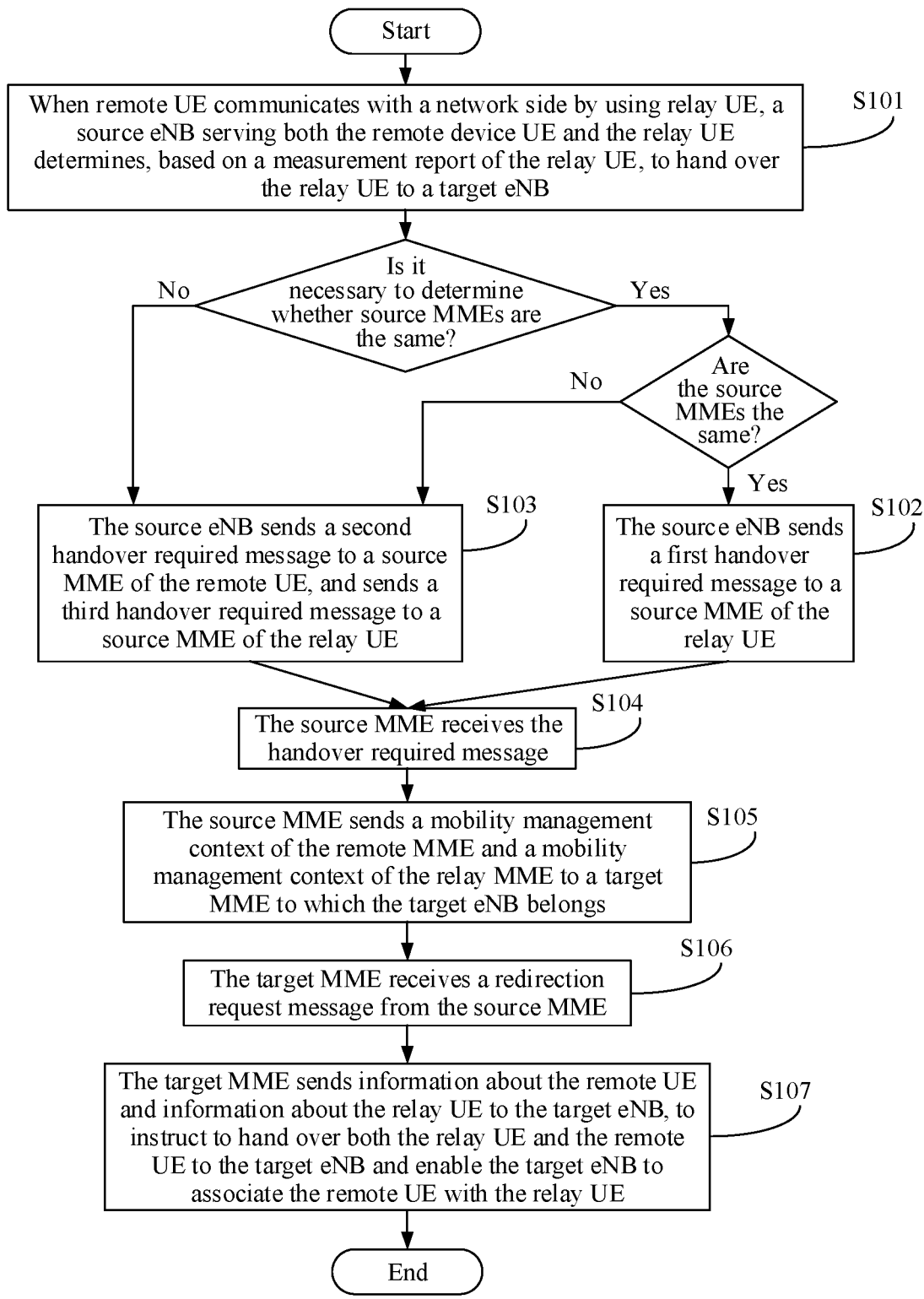
FIG. 4 is a flowchart of an S1 handover-based handover method according to an embodiment of this application.

An embodiment of this application provides a handover method, used for S1 handover between eNBs. Referring to FIG. 4, the method includes operations S101 to S107.

Operation S101. When remote UE communicates with a network side by using relay UE, a source eNB serving both the remote UE and the relay UE determines, based on a measurement report of the relay UE, to hand over the relay UE to a target eNB.

The source eNB serving both the remote UE and the relay UE may be understood as not only a base station serving the remote UE but also a base station serving the relay UE.

If determining that the relay UE is UE of a relay type, the source eNB performs handover of the relay type. A difference from common handover lies in that: The source eNB hands over, to the target eNB, a context of another remote UE bound to the relay UE. In this case, the source eNB determines to perform S1 interface handover.

When a source MME of the remote UE is the same as a source MME of the relay UE, operation S102 is performed. When there is no need to determine whether a source MME of the remote UE is the same as a source MME of the relay UE, or when a source MME of the remote UE is different from a source MME of the relay UE, operation S103 is performed.

Operation S102. The source eNB sends a first handover required message (handover required) to the source MME of the relay UE, where the first handover required message includes identifier information of the relay UE and identifier information of the remote UE, and the first handover required message is used to instruct both the relay UE and the remote UE to the target eNB.

The source MME of the remote UE is an MME currently serving the remote UE, and the source MME of the relay UE is an MME currently serving the relay UE.

The identifier information of the relay UE or the identifier information of the remote UE may include at least one of the following: an S1-AP identity, for example, an MME UE S1AP ID and an eNB UE S1AP ID; and an identifier allocated by the MME, for example, a globally unique temporary UE identity (GUTI), a system architecture evolution (SAE)-temporary mobile subscriber identity (S-TMSI), and an MME-temporary mobile subscriber identity (M-TMSI).

There may be a plurality of manners of instructing, by using the first handover required message, to hand over both the relay UE and the remote UE. For example, the first handover required message includes group handover indication information, and the group handover indication information is used to instruct to hand over both the relay UE and the remote UE to the target eNB. Alternatively, a message header of the first handover required message includes a message type, and the message type is used to instruct to hand over both the relay UE and the remote UE to the target eNB.

In one embodiment, the first handover required message may further include an association relationship between the relay UE and the remote UE. In one embodiment, if the source MME stores the association relationship between the relay UE and the remote UE, the message does not need to carry the association relationship between the relay UE and the remote UE, or does not need to carry the identifier information of the remote UE.

Operation S104 is performed after operation S102.

Operation S103. The source eNB sends a second handover required message to the source MME of the remote UE, where the second handover request includes identifier information of the relay UE, and the second handover required message is used to instruct to hand over the remote UE to the target eNB and associate the remote UE with relay UE corresponding to an identifier of the relay UE; and the source eNB sends a third handover required message to the source MME of the relay UE, where the third handover request includes the identifier information of the relay UE, and the third handover required message is used to instruct to hand over the relay UE to the target eNB.

An order of sending the second handover required message and the third handover required message is not limited in this embodiment of this application. However, the remote UE can be associated with the relay UE only after the relay UE is also handed over to the target eNB.

This operation means that if finding that source MMEs of some remote UEs are not the source MME of the relay UE, the source eNB separately sends handover required messages for the remote UEs. Similarly, the second handover required message may further include an association relationship between the relay UE and the remote UE. In one embodiment, if the source MME stores the association relationship between the relay UE and the remote UE, the message does not need to carry the association relationship between the relay UE and the remote UE, or does not need to carry the identifier information of the relay UE.

Operation S104. The source MME receives the handover required message from the source eNB serving both the relay UE and the remote UE.

If determining, based on the handover required message received from the source eNB, that the handover is group handover in a relay scenario, the source MME initiates a group handover procedure for the relay UE and the remote UE associated with the relay UE.

In one embodiment, the source MME may determine, based on the group handover indication information in the handover required message, that the handover is the group handover in the relay scenario; determine, based on the message type in the message header of the handover required message, that the handover is the group handover in the relay scenario; or determine, based on that the handover required message carries the identifier information of the relay UE and/or the association relationship between the relay UE and the remote UE, that the handover is the group handover in the relay scenario.

Operation S105. The source MME sends a mobility management (MM) context of the remote UE and a mobility management context of the relay UE to a target MME to which the target eNB belongs, to hand over both the remote UE and the relay UE to the target eNB.

The source MME described herein may be the MME of both the remote UE and the relay UE, or may include the MME of the remote UE or the MME of the relay UE. The source MME may hand over both the remote UE and the relay UE. In this case, operation S1051 is performed. Alternatively, the source MME may separately hand over the remote UE, and then bind the remote UE to the relay UE. In this case, step S1052 is performed.

Figure 5A:
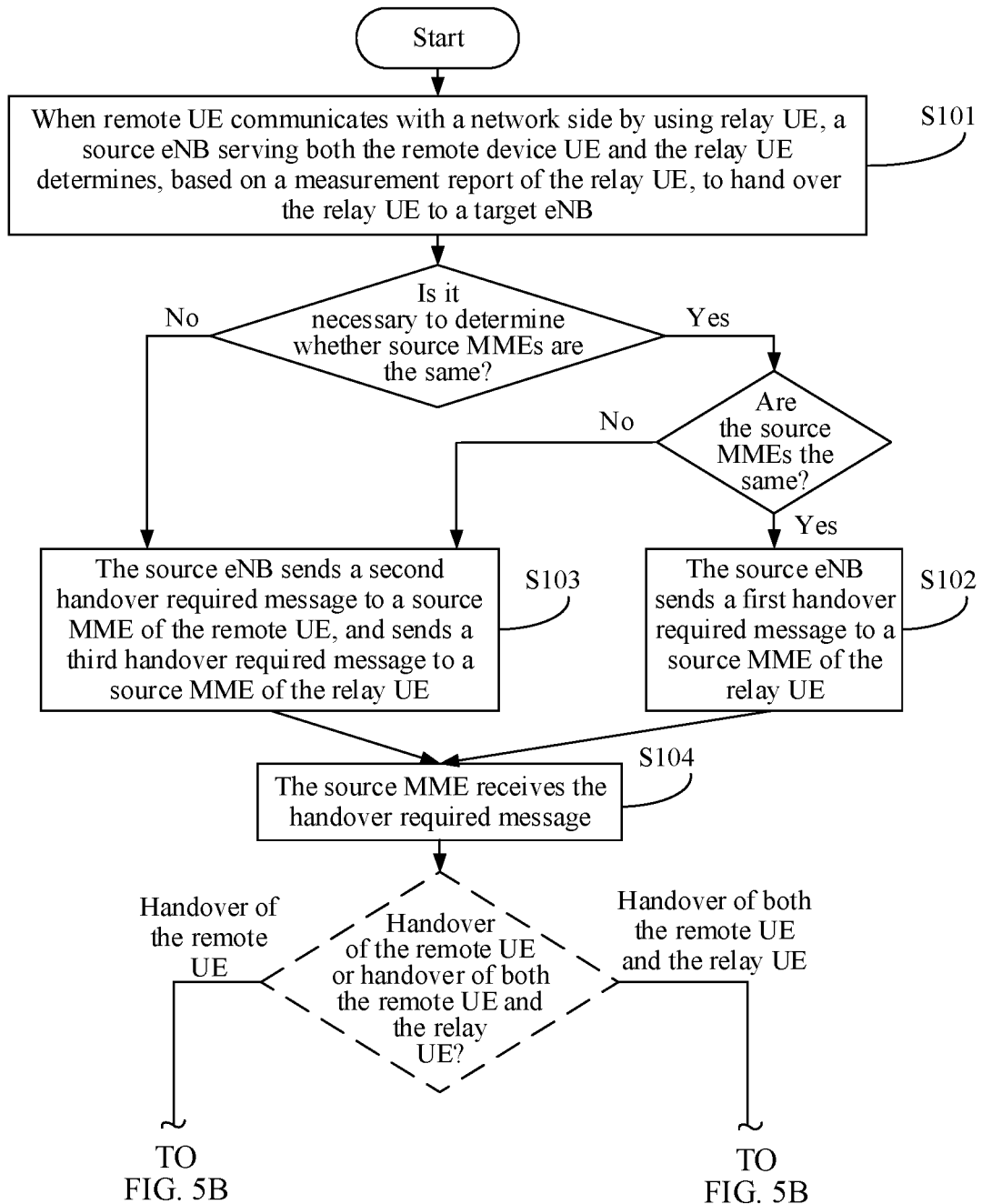
FIG. 5A and FIG. 5B are a flowchart of another S1 handover-based handover method according to an embodiment of this application.
Figure 5B:
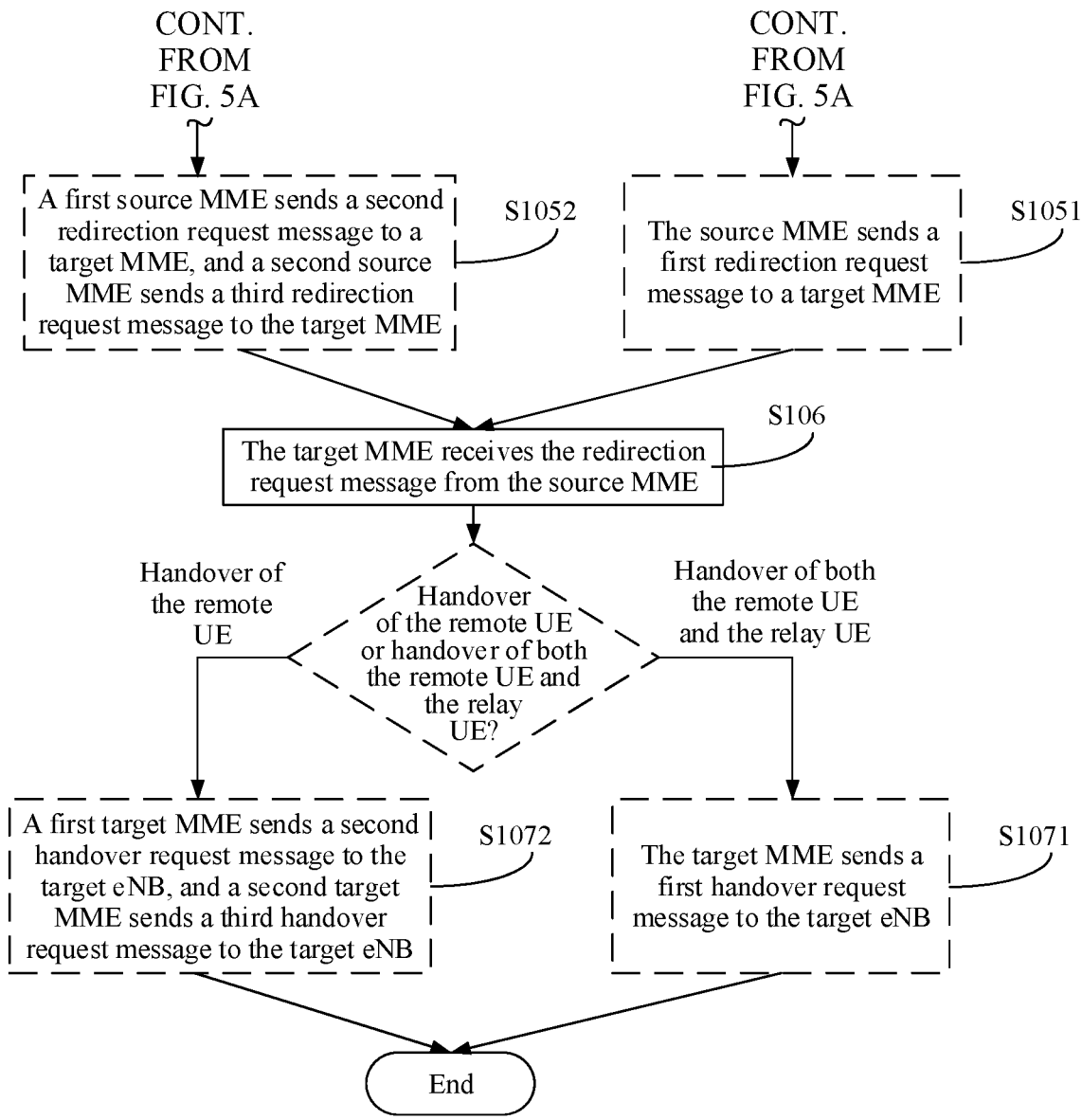

Specifically, referring to FIG. 5A and FIG. 5B, operation S105 may include operation S1051.

Operation S1051. The source MME sends a first redirection request message to the target MME, where the first redirection request message includes the mobility management context of the relay UE and the mobility management context of the remote UE, to hand over both the remote UE and the relay UE to the target eNB.

The source MME may send a redirection request message (forward relocation request) to the target MME, where the redirection request message includes the mobility management context of the relay UE and the mobility management context of the remote UE, to hand over both the remote UE and the relay UE.

Specifically, referring to FIG. 5A and FIG. 5B, operation S105 may include operation S1052.

Operation S1052. A first source MME sends a second redirection request message to the target MME, where the second redirection request message includes the mobility management context of the relay UE; and a second source MME sends a third redirection request message to the target MME, where the third redirection request message includes the mobility management context of the remote UE and the identifier information of the relay UE, to hand over the remote UE to the target eNB and associate the remote UE with the relay UE corresponding to the identifier of the relay UE.

The source MME may separately send the mobility management context of the remote UE and the identifier information of the relay UE to the target MME, to separately hand over the remote UE; and then bind the remote UE to the relay UE. That is, the mobility management context of the remote UE and the mobility management context of the relay UE may be separately carried in two redirection request messages.

The first source MME and the second source MME may be a same MME or different MMEs. When the first source MME and the second source MME are a same MME, the first source MME and the second source MME are the MME of both the remote UE and the relay UE. When the first source MME and the second source MME are different MMEs, the first source MME is an MME to which the relay UE belongs, and the second source MME is an MME to which the remote UE belongs.

In one embodiment, the second source MME may further obtain second identifier information of the relay UE in the third redirection request message based on first identifier information of the relay UE in the handover required message.

Operation S106. The target MME receives the redirection request message from the source MME.

Operation S107. The target MME sends information about the remote UE and information about the relay UE to the target eNB, to instruct to hand over both the relay UE and the remote UE to the target eNB and enable the target eNB to associate the remote UE with the relay UE.

The information about the remote UE or the information about the relay UE includes: EPS bearers to setup, aggregate maximum bit rate (AMBR), source to target transparent container, handover restriction list, and the like.

The target MME described herein may be an MME of both the remote UE and the relay UE, or may include an MME of the remote UE or an MME of the relay UE. Similarly, the target MME may hand over both the remote UE and the relay UE. In this case, operation S1071 is performed. Alternatively, the target MME may separately hand over the remote UE, and then bind the remote UE to the relay UE. In this case, operation S1072 is performed.

Specifically, referring to FIG. 5A and FIG. 5B, operation S107 may include operation S1071.

Operation S1071. The target MME sends a first handover request message to the target eNB, where the first handover request message includes the information about the remote UE and the information about the relay UE, and the first handover request message is used to instruct to hand over both the relay UE and the remote UE to the target eNB and enable the target eNB to associate the remote UE with the relay UE.

Specifically, referring to FIG. 5A and FIG. 5B, operation S107 may include step S1072.

Operation S1072. A first target MME sends a second handover request message to the target eNB, where the second handover request message includes the information about the relay UE; and a second target MME sends a third handover request message to the target eNB, where the third handover request message includes the information about the remote UE and the identifier information of the relay UE, the third handover request message is used to instruct to hand over the remote UE to the target eNB and associate the remote UE with the relay UE corresponding to the identifier information of the relay UE, and the first target MME and the second target MME may be a same MME or different MMEs.

According to the handover method provided in this embodiment of this application, the remote UE communicates with the network side by using the relay UE, the source eNB serving both the remote UE and the relay UE determines, based on the measurement report of the relay UE, to hand over the relay UE to the target eNB, and also needs to hand over the remote UE to the target eNB. In one embodiment, when the source MME of the remote UE is the same as the source MME of the relay UE, the source eNB sends the first handover required message to the source MME of the relay UE, where the first handover required message includes the identifier information of the relay UE and the identifier information of the remote UE, to instruct to hand over both the relay UE and the remote UE to the target eNB; or when the source MME of the remote UE is different from the source MME of the relay UE, the source eNB sends the second handover required message to the source MME of the remote UE, where the second handover request includes the identifier information of the relay UE, so that the remote UE is, after handed over to the target eNB, associated with the relay UE corresponding to the identifier of the relay UE. In one embodiment, there is no need to determine whether the source MMEs are the same. The source eNB sends the first handover required message to the source MME of the relay UE, where the first handover required message is used to instruct to hand over the relay UE to the target eNB; and the source eNB sends the second handover required message to the source MME of the remote UE, where the second handover request includes the identifier information of the relay UE, and the second handover required message is used to instruct to hand over the remote UE to the target eNB and associate the remote UE with the relay UE corresponding to the identifier of the relay UE. In one embodiment, the source MME sends the mobility management context of the remote UE and the mobility management context of the relay UE to the target MME to which the target eNB belongs, to hand over both the remote UE and the relay UE to the target eNB. In one embodiment, the source MME sends the redirection request message to the target MME to which the target eNB belongs, where the redirection request message includes the mobility management context of the remote UE and the identifier information of the relay UE, to hand over the remote UE to the target eNB and associate the remote UE with the relay UE. In one embodiment, the target MME sends the information about the remote UE and the information about the relay UE to the target eNB, to instruct to hand over both the relay UE and the remote UE to the target eNB and enable the target eNB to associate the remote UE with the relay UE. In one embodiment, the target MME sends the handover request message to the target eNB, where the handover request message includes the information about the remote UE and the identifier information of the relay UE, and the handover request message is used to instruct to hand over the remote UE to the target eNB and associate the remote UE with the relay UE corresponding to the identifier information of the relay UE. S1 handover of both the remote UE and the relay UE between the eNBs is implemented by using the foregoing communication processes.

Figure 6A:
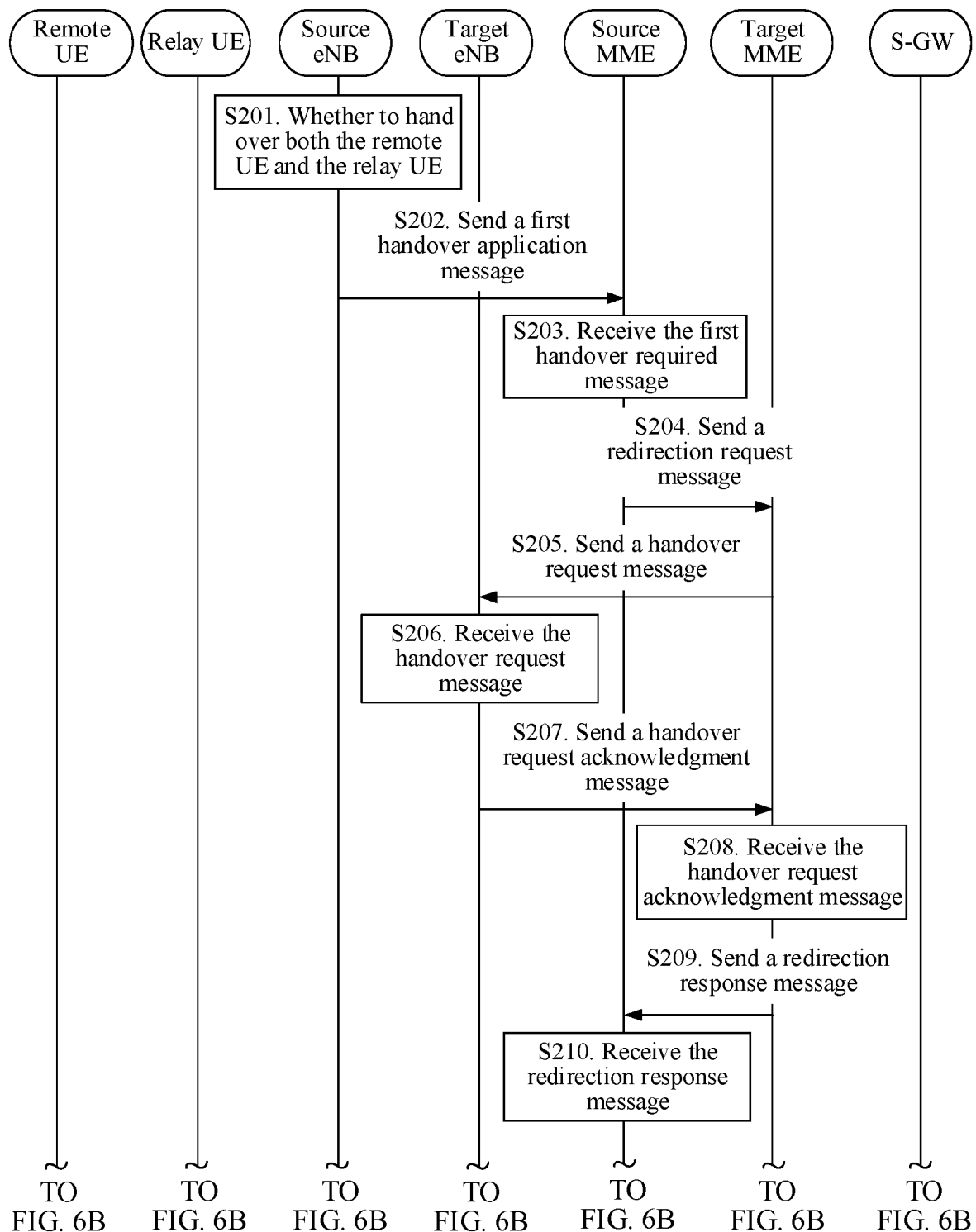
FIG. 6A and FIG. 6B are a flowchart of still another S1 handover-based handover method according to an embodiment of this application.
Figure 6B:
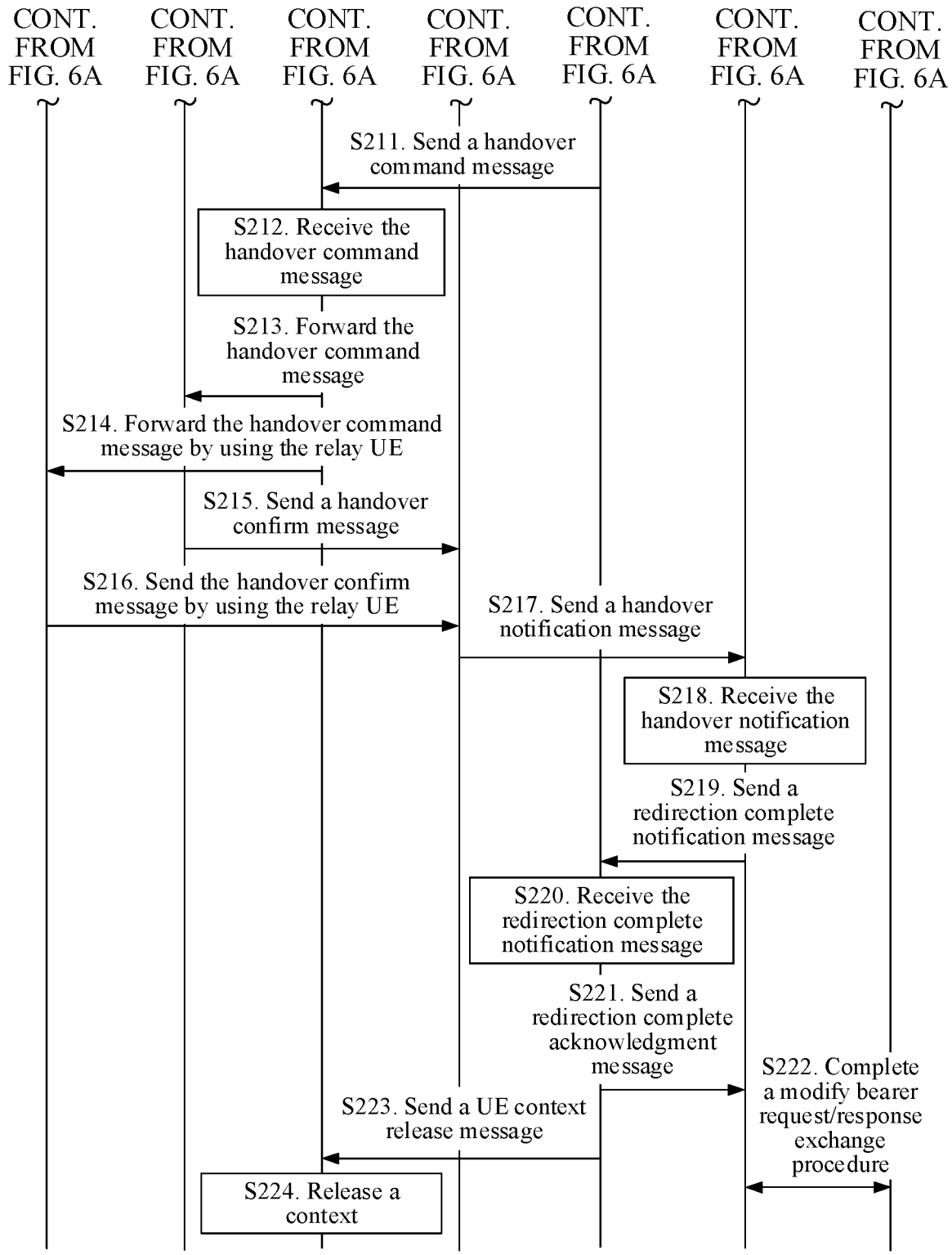

An embodiment of this application provides another handover method, used for S1 handover between eNBs. Referring to FIG. 6A and FIG. 6B, the method includes operations S201 to S224.

Operation S201. When remote UE communicates with a network side by using relay UE, a source eNB serving both the remote UE and the relay UE determines, based on a measurement report of the relay UE, to hand over the relay UE to a target eNB.

This operation is the same as operation S101, and details are not described herein again.

Operation S202. When a source MME of the remote UE is the same as a source MME of the relay UE, the source eNB sends a first handover required message to the source MME of the relay UE.

This operation is the same as operation S102, and details are not described herein again.

Operation S203. The source MME receives the first handover required message.

This operation is the same as operation S104, and details are not described herein again.

Operation S204. The source MME sends a redirection request message to a target MME, where the redirection request message includes a mobility management context of the relay UE and a mobility management context of the remote UE.

This operation is the same as operation S1051, and details are not described herein again.

Operation S205. After receiving the redirection request message from the source MME, the target MME sends a handover request message (handover request) to the target eNB, where the handover request message includes first information of the remote UE and first information of the relay UE.

This operation is the same as operation S1071, and details are not described herein again.

Operation S206. The target eNB receives the handover request message from the target MME.

Operation S207. The target eNB sends a handover request acknowledgment message to the target MME, where the handover request acknowledgment message includes second information of the relay UE and second information of the remote UE.

The second information includes: EPS bearer setup list, EPS bearers failed to setup list, source to target transparent container, and the like.

Operation S208. The target MME receives the handover request acknowledgment message.

Operation S209. The target MME sends a redirection response message (forward relocation response) to the source MME, where the redirection response message includes third information of the relay UE and third information of the remote UE.

The third information includes: target to source transparent container, serving gateway change indication, EPS bearer setup list, serving gateway address and tunnel endpoint identifiers for indirect forwarding (Serving GW Address and TEIDs for indirect forwarding), and the like.

Operation S210. The source MME receives the redirection response message.

Operation S211. The source MME sends a handover command message (handover command) to the source eNB, where the handover command message includes fourth information of the relay UE and fourth information of the remote UE.

The fourth information includes: the target to source transparent container, bearers subject to forwarding, bearers to release, and the like.

Operation S212. The source eNB receives the handover command message.

Operation S213. The source eNB forwards the handover command message to the relay UE.

The handover command message includes the target to source transparent container.

Operation S214. The source eNB forwards the handover command message to the remote UE by using the relay UE.

The handover command message includes the target to source transparent container.

Operation S215. The relay UE sends a handover confirm message to the target eNB.

Operation S216. The remote UE sends a handover confirm message to the target eNB by using the relay UE.

Operation S217. The target eNB sends a handover notification message to the target MME.

Operation S218. The target MME receives the handover notification message.

Operation S219. The target MME sends a redirection complete notification message (forward relocation complete notification) to the source MME.

Operation S220. The source MME receives the redirection complete notification message.

Operation S221. The source MME sends a redirection complete acknowledgment message (forward relocation complete acknowledge) to the target MME.

Operation S222: The target MME and an SGW complete a modify bearer request/response exchange procedure, to complete modifying bearers of the relay UE and the remote UE associated with the relay UE.

Operation S223. The source MME sends a UE context release message to the source eNB.

The UE context release message includes group handover indication information, and in one embodiment, may further include an identifier of the relay UE and/or identifiers of all remote UEs associated with the relay UE.

Operation S224. The source eNB releases a context of the relay UE and a context of the remote UE based on the UE context release message.

According to the handover method provided in this embodiment of this application, the remote UE and the relay UE are both handed over in a wearable scenario based on S1 handover between the MMEs.

Figure 7A:
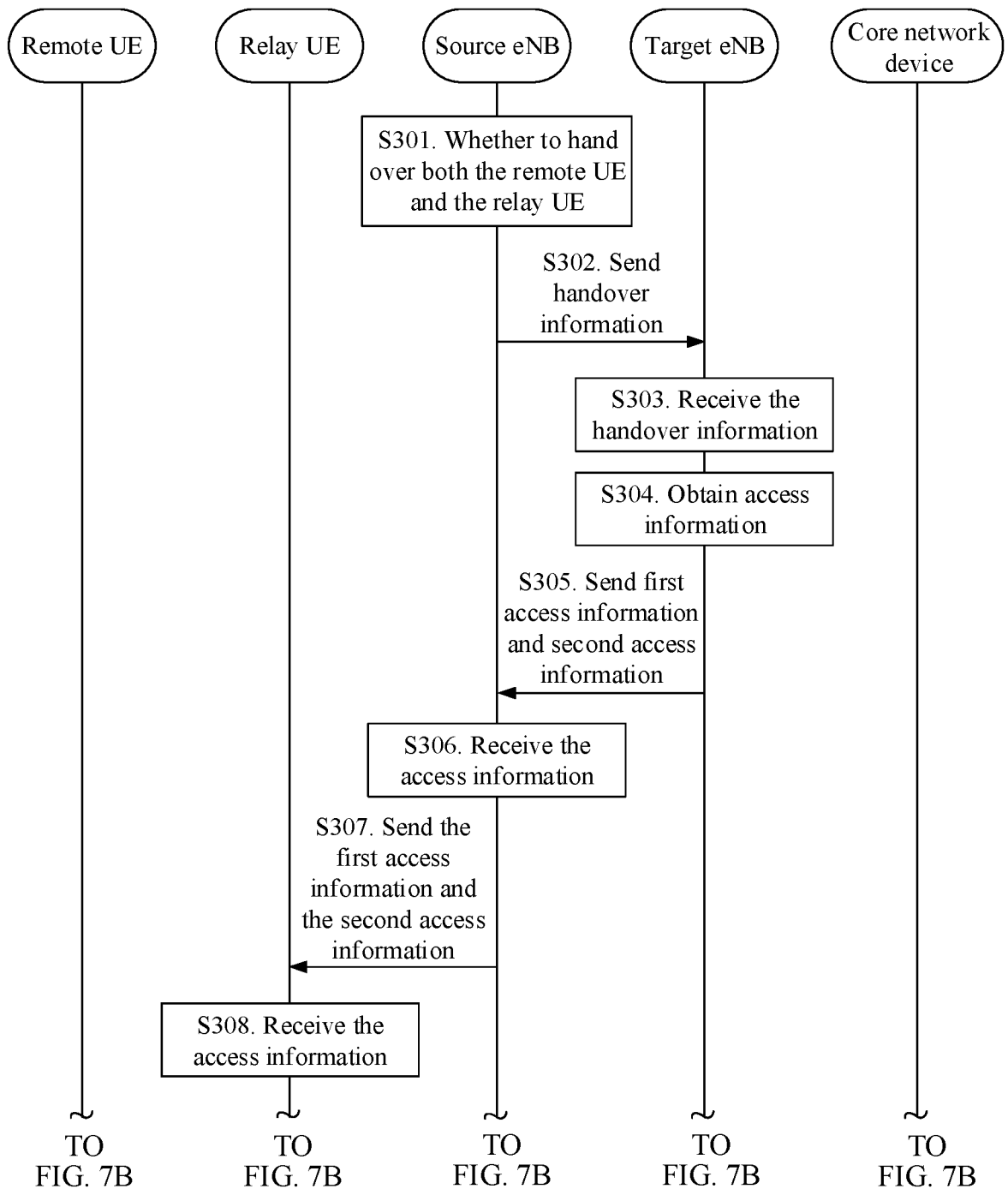
FIG. 7A and FIG. 7B are a flowchart of an X2 handover-based handover method according to an embodiment of this application.
Figure 7B:
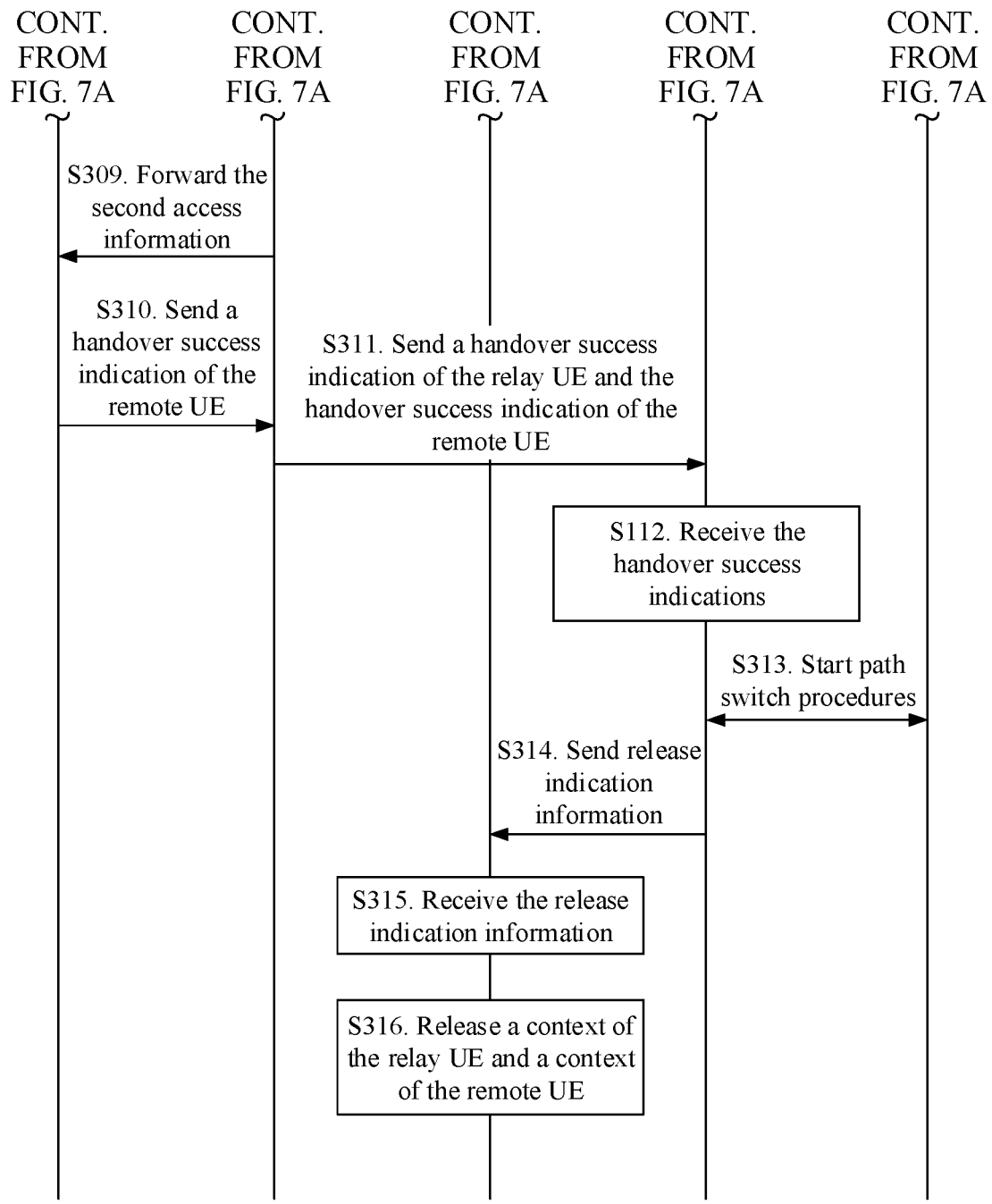

An embodiment of this application provides a handover method, used for X2 handover between eNBs. Referring to FIG. 7A and FIG. 7B, the method includes operations S301 to S316.

Operation S301. A source eNB determines, based on a measurement report of relay UE and depending on whether there is remote UE communicating with the source eNB by using the relay UE, whether to hand over both the relay UE and the remote UE to a target eNB.

The source eNB directly communicates with the relay UE, and can obtain the measurement report of the relay UE. When the relay UE is UE of a relay type (to be specific, there is the remote UE communicating with the source eNB by using the relay UE), the source eNB may determine, based on the measurement report and depending on whether there is the remote UE communicating with the source eNB by using the relay UE, whether to hand over both the relay UE and the remote UE to the target eNB. A specific handover reason may be low quality or a low receive level. Details are not described in this application.

Operation S302. When determining to hand over both the relay UE and the remote UE to the target eNB, the source eNB sends handover information of the relay UE and handover information of the remote UE to the target eNB, to initiate handover to the target eNB, where the handover information of the relay UE includes a context of the relay UE, and the handover information of the remote UE includes a context of the remote UE.

A difference from common handover (i.e., there is no remote UE communicating with the source eNB by using the relay UE) is that, both the context of the relay UE and the context of the remote UE need to be handed over to the target eNB.

The handover information is basic information that is of to-be-handed-over UE and that is necessary for a handover procedure when the source eNB initiates the handover to the target eNB. For example, the handover information of the relay UE may include: the context of the relay UE, an identifier of the relay UE, and an association relationship between the relay UE and the remote UE. The identifier of the relay UE or the association relationship between the relay UE and the remote UE may alternatively be a part of the context of the relay UE. Similarly, the handover information of the remote UE may include: the context of the remote UE, an identifier of the remote UE, and the association relationship between the relay UE and the remote UE. The identifier of the remote UE or the association relationship between the relay UE and the remote UE may alternatively be a part of the context of the remote UE.

In addition, when sending the handover information of the relay UE and the handover information of the remote UE to the target eNB by using a specific message, the source eNB may further add handover type indication information to the message, where the handover type indication information is used to indicate whether a requested handover type is group handover (that is, handover of both the relay UE and the remote UE) or common handover. It should be noted that a manner of carrying the handover type indication information is not limited in this embodiment of this application. For example, the handover type indication information may be carried in a newly added information element in the message, or may be directly carried in a message type information element in an original message header.

Specifically, the source eNB may send the handover information of the relay UE and the handover information of the remote UE to the target eNB by using a handover request message.

For the handover type indication information, an indication information information-element may be newly added to the handover request message. The indication information information-element is used to instruct to hand over both the relay UE and the remote UE. Alternatively, a message type in a message header of the handover request message is directly used to instruct to hand over both the relay UE and the remote UE.

Operation S303. The target eNB receives the handover information of the relay UE and the handover information of the remote UE from the source eNB, to determine whether the relay UE and the remote UE are both allowed to be handed over from the source eNB to the target eNB.

Operation S304. When determining that the relay UE and the remote UE are both allowed to be handed over, the target eNB obtains first access information based on the handover information of the relay UE, so that the relay UE is handed over and accesses the target eNB; and obtains second access information based on the handover information of the remote UE, so that the remote UE is handed over and accesses the target eNB by using the relay UE.

The first access information may include a new cell radio network temporary identifier (C-RNTI) allocated to the relay UE, a security algorithm identifier selected by the target eNB, and the like. Similarly, the second access information may include a new C-RNTI allocated to the remote UE, a security algorithm identifier selected by the target eNB, and the like.

Operation S305. The target eNB sends the first access information and the second access information to the source eNB, so that the source eNB forwards the first access information to the relay UE, and forwards the second access information to the remote UE.

Specifically, the target eNB may send the first access information and the second access information to the source eNB by using a handover request acknowledgment message.

Operation S306. The source eNB receives the first access information and the second access information from the target eNB.

Operation S307. The source eNB sends the first access information and the second access information to the relay UE, so that the relay UE forwards the second access information to the remote UE.

Specifically, the source eNB may send the first access information and the second access information to the relay UE by using a radio resource control (RRC) connection reconfiguration message.

Operation S308. The relay UE receives the first access information and the second access information from the source eNB.

Operation S309. The relay UE forwards the second access information to the remote UE.

Operation S310. The remote UE sends a handover success indication of the remote UE to the relay UE, where the handover success indication of the remote UE is used to indicate that the remote UE is successfully handed over and accesses the target eNB by using the relay UE.

Operation S311. The relay UE sends a handover success indication of the relay UE and the handover success indication of the remote UE to the target eNB, where the handover success indication of the relay UE is used to indicate that the relay UE is successfully handed over and accesses the target eNB.

Specifically, the relay UE may send the handover success indication of the relay UE and the handover success indication of the remote UE to the target eNB by using an RRC connection reconfiguration complete message.

Operation S312. The target eNB receives the handover success indication of the relay UE and the handover success indication of the remote UE from the relay UE.

Operation S313. The target eNB separately initiates path switch procedures for the relay UE and the remote UE.

Operation S314. After determining that the relay UE and the remote UE complete the path switch procedures, the target eNB sends release indication information to the source eNB, where the release indication information is used to instruct the source eNB to release the context of the relay UE and the context of the remote UE.

Specifically, the target eNB may send the release indication information to the source eNB by using a UE context release message. In one embodiment, the release indication information may include the identifier of the relay UE, and may further include the identifier of the remote UE.

Operation S315. The source eNB receives the release indication information from the target eNB.

Operation S316. The source eNB releases the context of the relay UE and the context of the remote UE according to the release indication message.

Specifically, when the release indication information includes the identifier of the relay UE, operation S316 may specifically include: releasing, by the source eNB, the context of the relay UE based on the identifier of the relay UE; obtaining the identifier of the remote UE based on the identifier of the relay UE and the association relationship between the relay UE and the remote UE; and then releasing the context of the remote UE based on the identifier of the remote UE.

When the release indication information includes the identifier of the relay UE and the identifier of the remote UE, step S316 may specifically include: releasing, by the source eNB, the context of the relay UE based on the identifier of the relay UE; and releasing the context of the remote UE based on the identifier of the remote UE.

According to the handover method provided in this embodiment of this application, when the source eNB initiates to hand over both the remote UE and the relay UE to the target eNB, the handover information of the remote UE and the handover information of the relay UE are carried, and include the context of the remote UE and the context of the relay UE. The target eNB obtains the access information of the remote UE and the access information of the relay UE based on the handover information of the remote UE and the handover information of the relay UE, and the source eNB forwards the access information to the remote UE and the relay UE, so that the remote UE and the relay UE access a target eNB based on respective access information. After the remote UE and the relay UE are successfully handed over and access the target eNB, the target eNB instructs the source eNB to release the context of the remote UE and the context of the relay UE. The context of the remote UE and the context of the relay UE are transferred from the source eNB to the target eNB, and the remote UE and the relay UE successfully access the target eNB. Therefore, the remote UE and the relay UE are both handed over in a wearable scenario.

The following further extends the foregoing handover method with reference to FIG. 8A and FIG. 8B, and FIG. 9A and FIG. 9B.

Figure 8A:
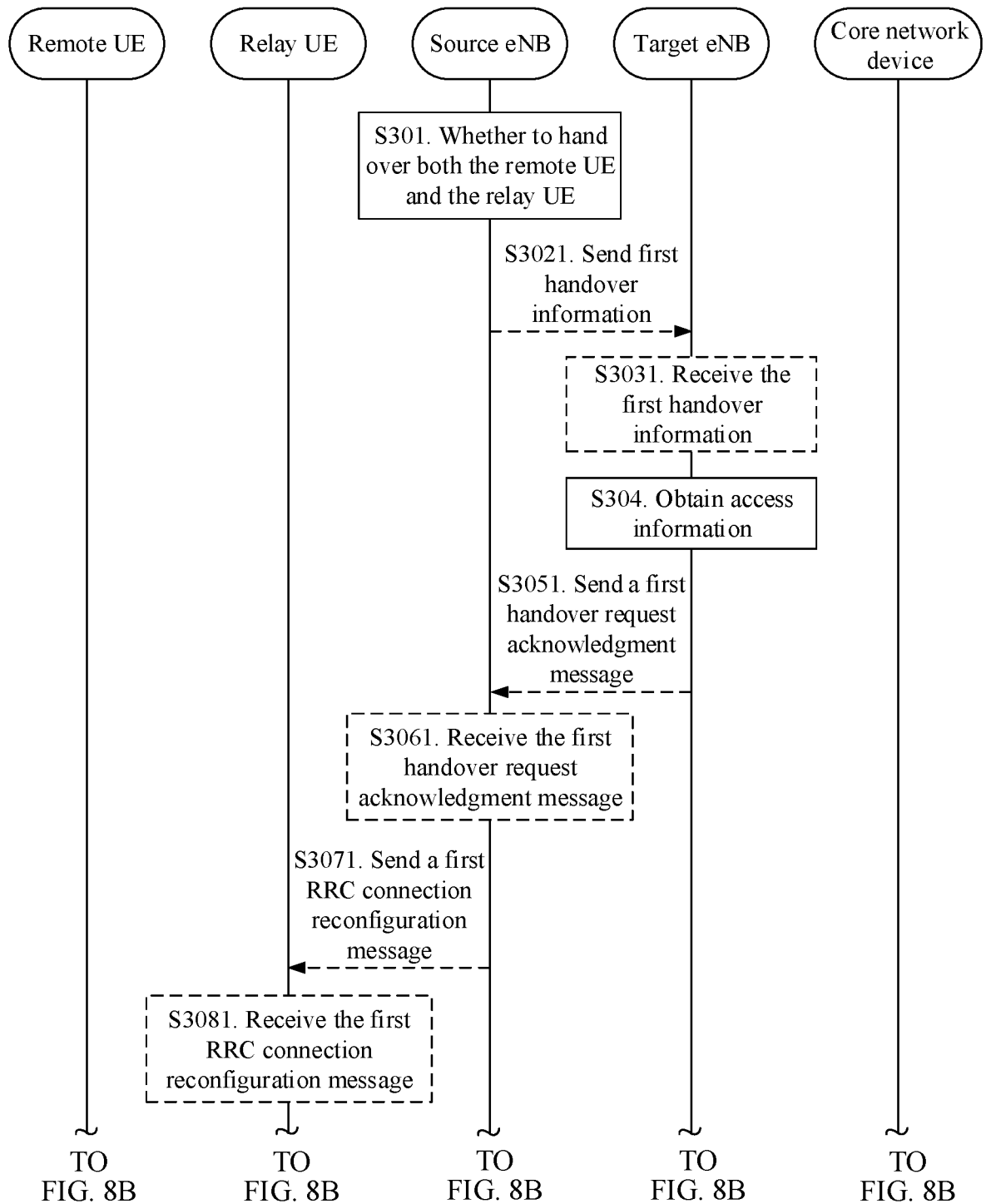
FIG. 8A and FIG. 8B are a flowchart of another X2 handover-based handover method according to an embodiment of this application.
Figure 8B:
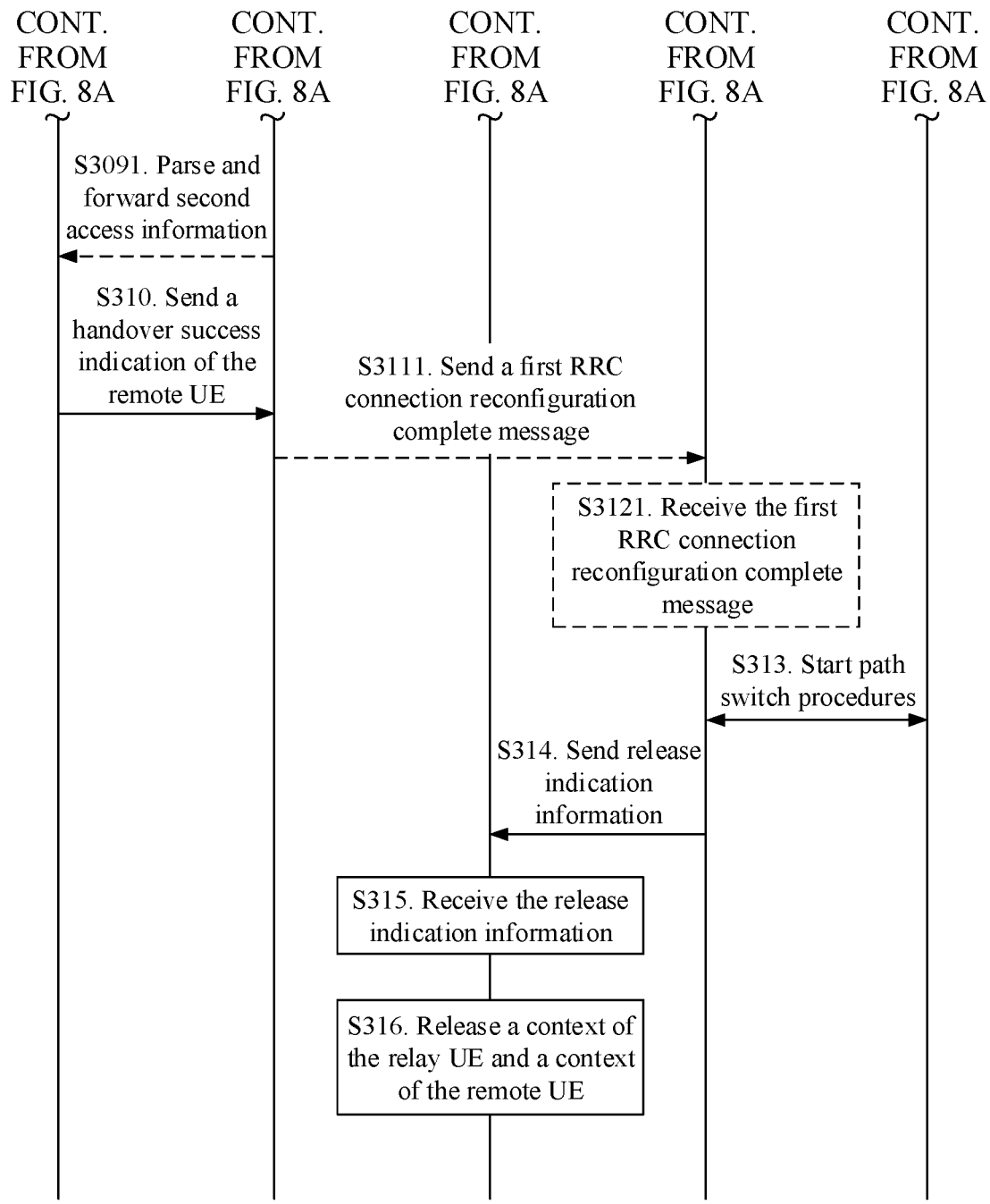

For operation S302:

In one embodiment, one handover request message may carry the handover information of the relay UE and the handover information of the remote UE. Referring to FIG. 8A and FIG. 8B, operation S302 may include operation S3021.

Operation S3021. The source eNB sends a first handover request message to the target eNB, where the first handover request message includes the handover information of the relay UE and the handover information of the remote UE.

Figure 9A:
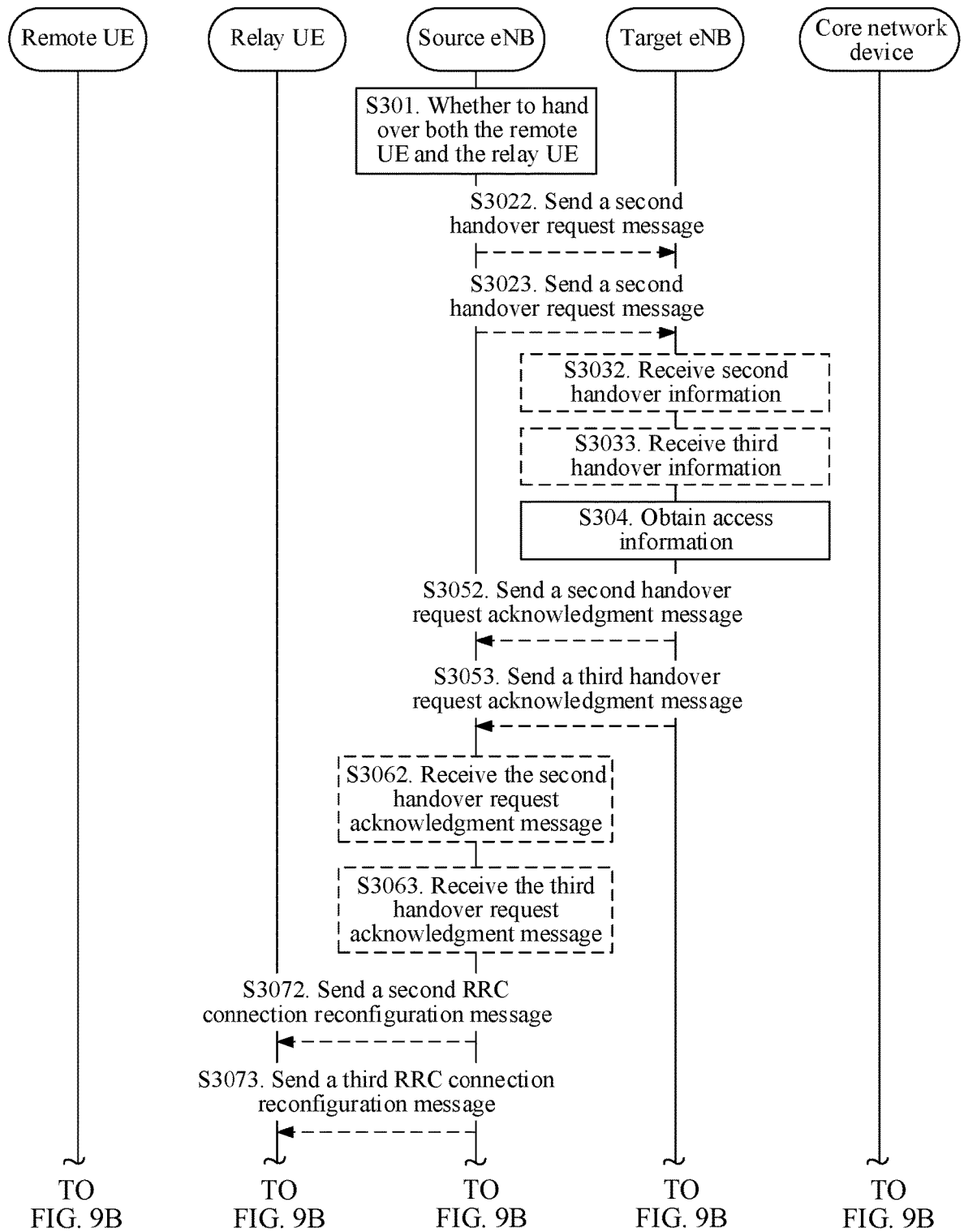
FIG. 9A and FIG. 9B are a flowchart of still another X2 handover-based handover method according to an embodiment of this application.
Figure 9B:
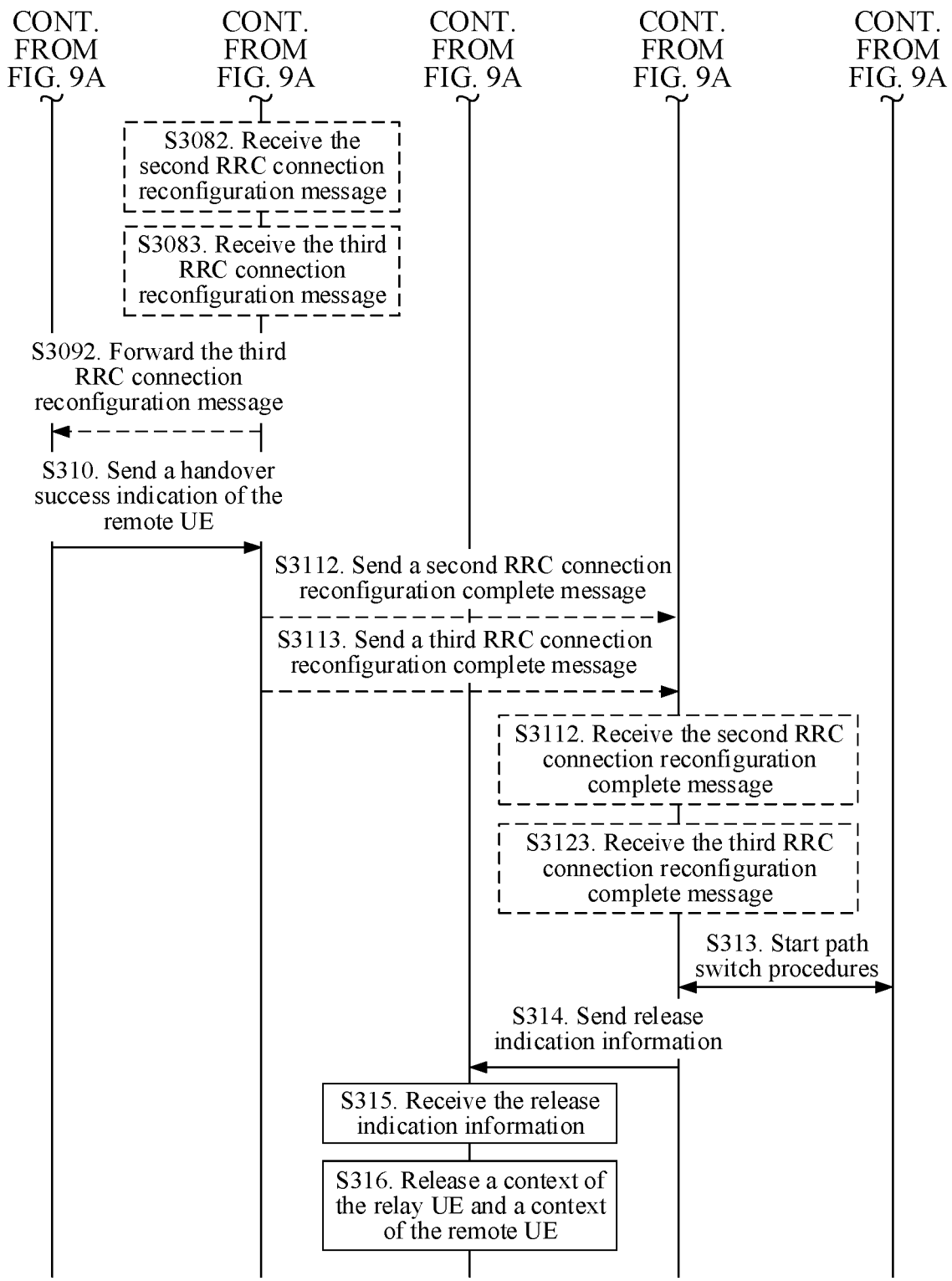

In one embodiment, one of two handover request messages may carry the handover information of the relay UE, and the other handover request message may carry the handover information of the remote UE. Further, an order of sending the two handover request messages is not limited. To be specific, the handover information of the relay UE may be first sent, or the handover information of the remote UE may be first sent. Referring to FIG. 9A and FIG. 9B, operation S302 may include operations S3022 and S3023.

Operation S3022. The source eNB sends a second handover request message to the target eNB, where the second handover request message includes the handover information of the relay UE.

Operation S3023. The source eNB sends a third handover request message to the target eNB, where the third handover request message includes the handover information of the remote UE.

Correspondingly, for operation S303:

In one embodiment, referring to FIG. 8A and FIG. 8B, operation S303 may include operation S3031.

Operation S3031. The target eNB receives the first handover request message from the source eNB, where the first handover request message includes the handover information of the relay UE and the handover information of the remote UE.

In one embodiment, referring to FIG. 9A and FIG. 9B, operation S303 may include operations S3032 and S3033.

Operation S3032. The target eNB receives the second handover request message from the source eNB, where the second handover request message includes the handover information of the relay UE.

Operation S3033. The target eNB receives the third handover request message from the source eNB, where the third handover request message includes the handover information of the remote UE.

For operation S305:

In one embodiment, one handover request acknowledgment message may carry the first access information and the second access information. Referring to FIG. 8A and FIG. 8B, operation S305 may include operation S3051.

Operation S3051. The target eNB sends a first handover request acknowledgment message to the source eNB, where the first handover request acknowledgment message includes the first access information and the second access information.

In one embodiment, one of two handover request acknowledgment messages may carry the first access information, and the other handover request acknowledgment message may carry the second access information. Further, an order of sending the two handover request acknowledgment messages is not limited. To be specific, the first access information may be first sent, or the second access information may be first sent. Referring to FIG. 9A and FIG. 9B, operation S305 may include operations S3052 and S3053.

Operation S3052. The target eNB sends a second handover request acknowledgment message to the source eNB, where the second handover request acknowledgment message includes the first access information.

Operation S3053. The target eNB sends a third handover request acknowledgment message to the source eNB, where the third handover request acknowledgment message includes the second access information.

Correspondingly, for operation S306:

In one embodiment, referring to FIG. 8A and FIG. 8B, operation S306 may include operation S3061.

Operation S3061. The source eNB receives the first handover request acknowledgment message from the target eNB, where the first handover request acknowledgment message includes the first access information and the second access information.

In one embodiment, referring to FIG. 9A and FIG. 9B, operation S306 may include operations S3062 and S3063.

Operation S3062. The source eNB receives the second handover request acknowledgment message from the target eNB, where the second handover request acknowledgment message includes the first access information.

Operation S3063. The source eNB receives the third handover request acknowledgment message from the target eNB, where the third handover request acknowledgment message includes the second access information.

For operation S307:

In one embodiment, one RRC connection reconfiguration message may carry the first access information and the second access information. The relay UE obtains the second access information through parsing and then forwards the second access information to the remote UE. Referring to FIG. 8A and FIG. 8B, operation S307 may include operation S3071.

Operation S3071. The source eNB sends a first RRC connection reconfiguration message to the relay UE, so that the relay UE forwards the second access information to the remote UE, where the first RRC connection reconfiguration message includes the first access information and the second access information.

In one embodiment, one of two RRC connection reconfiguration messages may carry the first access information, and the other RRC connection reconfiguration message may carry the second access information and is directly transparently transmitted by the relay UE to the remote UE. Further, an order of sending the two RRC connection reconfiguration messages is not limited. To be specific, the first access information may be first sent, or the second access information may be first sent. Referring to FIG. 9A and FIG. 9B, operation S307 may include operations S3072 and S3073.

Operation S3072. The source eNB sends a second RRC connection reconfiguration message to the relay UE, where the second RRC connection reconfiguration message includes the first access information.

Operation S3073. The source eNB sends a third RRC connection reconfiguration message to the relay UE, so that the relay UE forwards the second access information to the remote UE, where the third RRC connection reconfiguration message includes the second access information.

Correspondingly, for operation S308:

In one embodiment, referring to FIG. 8A and FIG. 8B, operation S308 may include operation S3081.

Operation S3081. The relay UE receives the first RRC connection reconfiguration message from the source eNB, where the first RRC connection reconfiguration message includes the first access information and the second access information.

In one embodiment, referring to FIG. 9A and FIG. 9B, operation S308 may include operations S3082 and S3083.

Operation S3082. The relay UE receives the second RRC connection reconfiguration message from the source eNB, where the second RRC connection reconfiguration message includes the first access information.

Operation S3083. The relay UE receives the third RRC connection reconfiguration message from the source eNB, where the third RRC connection reconfiguration message includes the second access information.

Correspondingly, for operation S309:

In one embodiment, referring to FIG. 8A and FIG. 8B, operation S309 may include operation S3091.

Operation S3091. The relay UE parses the first RRC connection reconfiguration message to obtain the second access information, and forwards the second access information to the remote UE.

In this embodiment of this application, a message used by the relay UE to forward the second access information to the remote UE is not limited. For example, an RRC message used for D2D communication may be used, or the RRC connection reconfiguration message may be reconstructed.

In one embodiment, referring to FIG. 9A and FIG. 9B, operation S309 may include operation S3092.

Operation S3092. The relay UE forwards the third RRC connection reconfiguration message to the remote UE.

In this case, the relay UE only acts as a relay for transparent transmission of the message.

For operation S311:

In one embodiment, one RRC connection reconfiguration complete message may carry the handover success indication of the relay UE and the handover success indication of the remote UE. Referring to FIG. 8A and FIG. 8B, operation S311 may include operation S3111.

Operation S3111. The relay UE sends a first RRC connection reconfiguration complete message to the target eNB, where the first RRC connection reconfiguration complete message includes the handover success indication of the relay UE and the handover success indication of the remote UE.

In one embodiment, one of two RRC connection reconfiguration complete messages may carry the handover success indication of the relay UE, and the other RRC connection reconfiguration complete message may carry the handover success indication of the remote UE. Further, an order of sending the two RRC connection reconfiguration complete messages is not limited. To be specific, the handover success indication of the relay UE may be first sent, or the handover success indication of the remote UE may be first sent. Referring to FIG. 9A and FIG. 9B, operation S311 may include operations S3112 and S3113.

Operation S3112. The relay UE sends a second RRC connection reconfiguration complete message to the target eNB, where the second RRC connection reconfiguration complete message includes the handover success indication of the relay UE.

Operation S3113. The relay UE sends a third RRC connection reconfiguration complete message to the target eNB, where the third RRC connection reconfiguration complete message includes the handover success indication of the remote UE.

Correspondingly, for operation S312:

Optionally, referring to FIG. 8A and FIG. 8B, step S312 may include operation S3121.

Operation S3121. The target eNB receives the first RRC connection reconfiguration complete message from the relay UE, where the first RRC connection reconfiguration complete message includes the handover success indication of the relay UE and the handover success indication of the remote UE.

In one embodiment, referring to FIG. 9A and FIG. 9B, operation S312 may include operations S3122 and S3123.

Operation S3122. The target eNB receives the second RRC connection reconfiguration complete message from the relay UE, where the second RRC connection reconfiguration complete message includes the handover success indication of the relay UE.

Operation S3123. The target eNB receives the third RRC connection reconfiguration complete message from the relay UE, where the third RRC connection reconfiguration complete message includes the handover success indication of the remote UE.

Although the handover method is described by using only two flowcharts, namely, FIG. 8A and FIG. 8B, and FIG. 9A and FIG. 9B, in this embodiment of this application, a person skilled in the art may understand that: First, a chronological order of performing the foregoing operations is not limited in this application. For example, operation S3023 may be first performed, and then step S3022 is performed; and operation S3033 is first performed, and then operation S3032 is performed. Details are not described.

Second, in the handover procedure in FIG. 8A and FIG. 8B or FIG. 9A and FIG. 9B, whether information is transmitted by using two messages or one message is not limited. For example, in a handover procedure, the source eNB may perform operation S3021 when sending the handover request message to the target eNB; and the target eNB may perform operations S3052 and S3053 when feeding back the handover request acknowledgment message to the source eNB. Details are not described.

Figure 10:
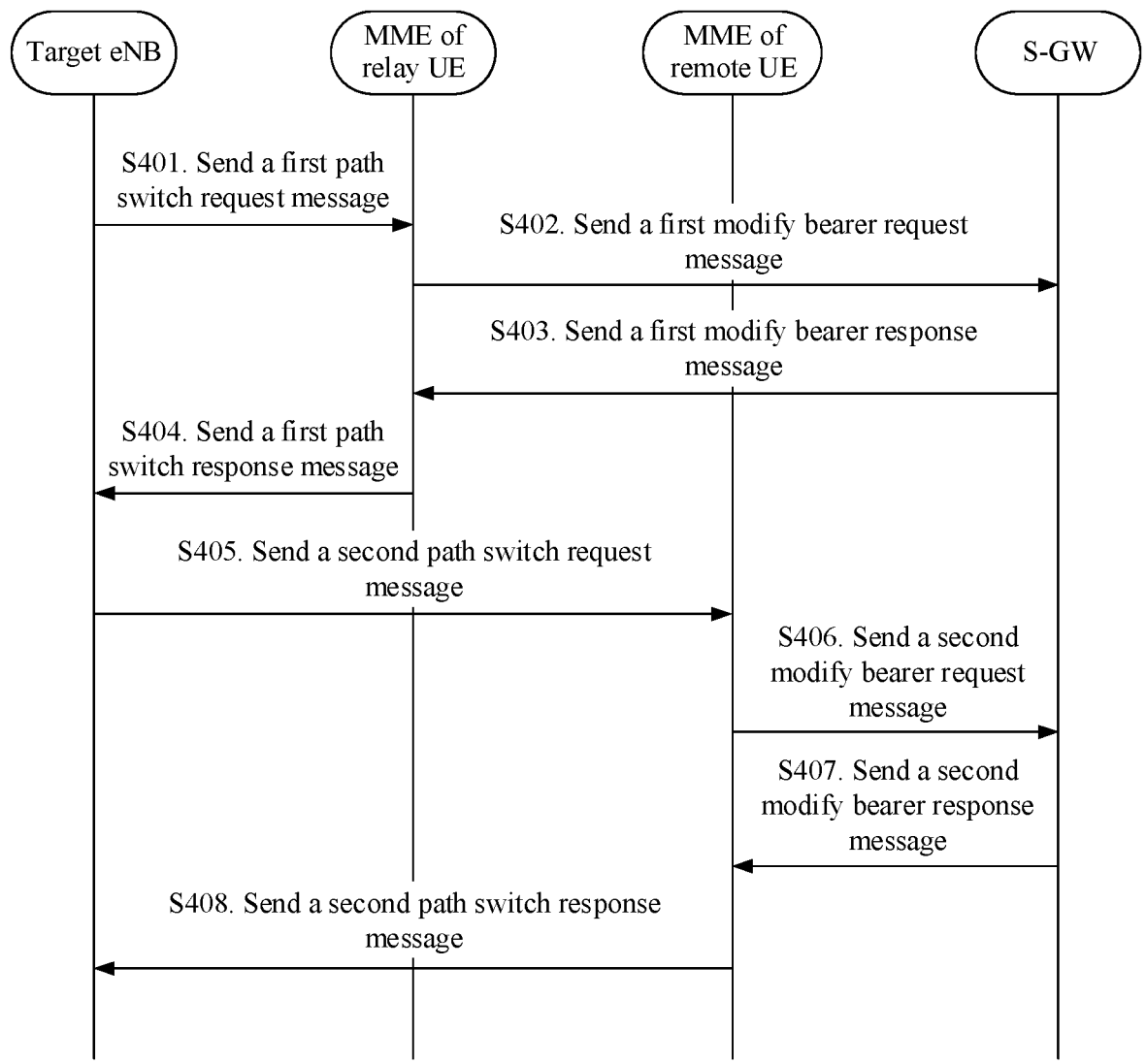
FIG. 10 is a flowchart of yet another X2 handover-based handover method according to an embodiment of this application.

For operation S313, in one embodiment, referring to FIG. 10, operation S313 may include the following operations.

Operation S401. The target eNB sends a first path switch request message to an MME to which the relay UE belongs, where the first path switch request message includes the identifier of the relay UE.

The first path switch request message is used to notify the MME to which the relay UE belongs that an access cell of the relay UE has changed, and request to update a node address of a service data channel.

Operation S402. The MME to which the relay UE belongs sends a first modify bearer request message to an S-GW.

Operation S403. The S-GW sends a first modify bearer response message to the MME to which the relay UE belongs.

Operation S404. The MME to which the relay UE belongs sends a first path switch response message to the target eNB.

The first path switch response message indicates that the relay UE may perform service communication on a new system architecture evolution (SAE) bearer.

Operation S405. The target eNB sends a second path switch request message to an MME to which the remote UE belongs, where the second path switch request message includes the identifier of the remote UE.

The second path switch request message is used to notify the MME to which the remote UE belongs that an access cell of the remote UE has changed, and request to update a node address of a service data channel.

Operation S406. The MME to which the remote UE belongs sends a second modify bearer request message to an S-GW.

Operation S407. The S-GW sends a second modify bearer response message to the MME to which the remote UE belongs.

Operation S408. The MME to which the remote UE belongs sends a second path switch response message to the target eNB.

The second path switch response message indicates that the remote UE may perform service communication on a new SAE bearer.

Figure 11:
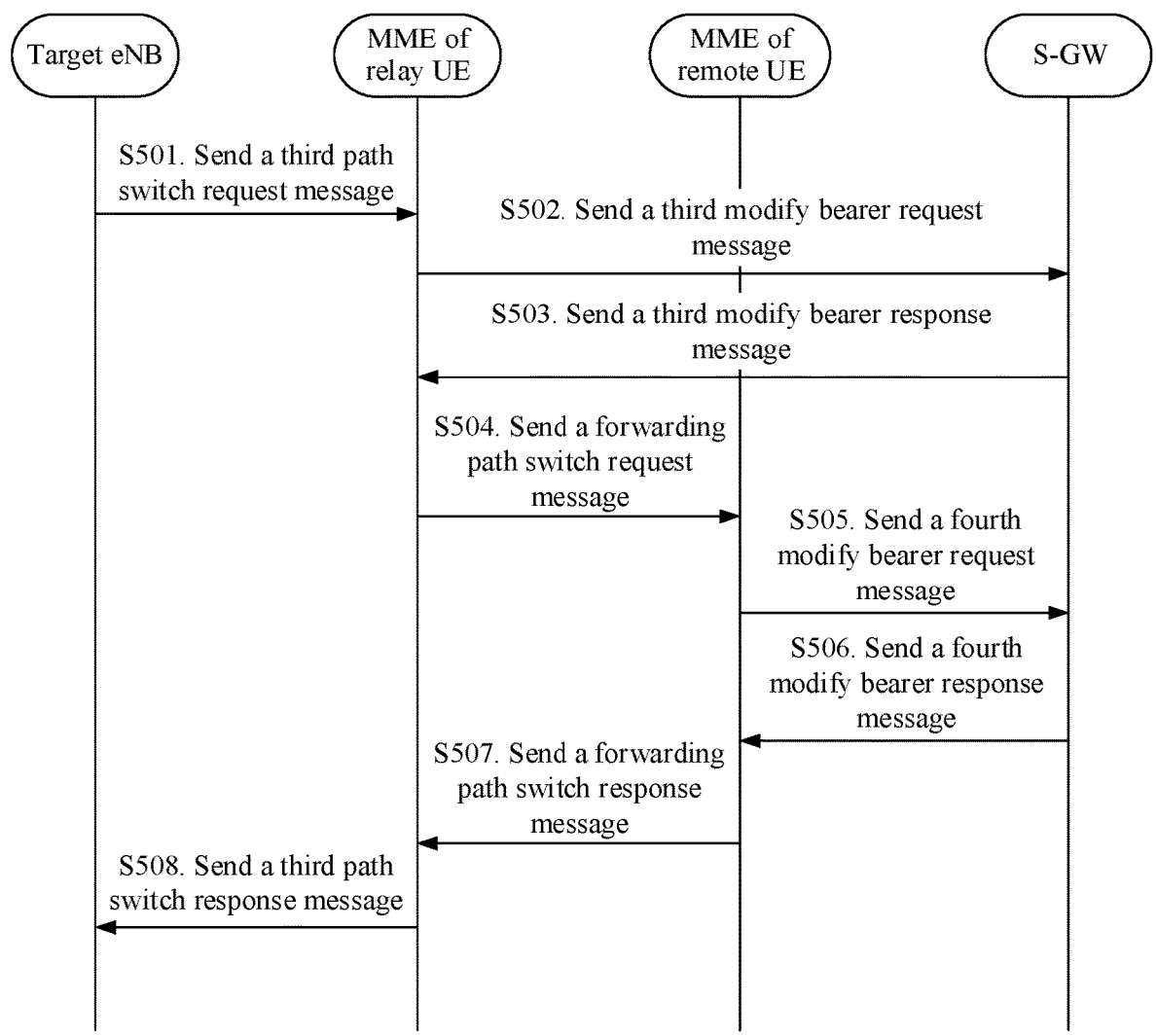
FIG. 11 is a flowchart of yet another X2 handover-based handover method according to an embodiment of this application.

In one embodiment, referring to FIG. 11, operation S313 may include the following operations.

Operation S501. The target eNB sends a third path switch request message to an MME to which the relay UE belongs, where the third path switch request message includes the identifier of the relay UE and the identifier of the remote UE.

The third path switch request message is used to notify the MME to which the relay UE belongs that an access cell of the relay UE has changed, and request to update a node address of a service data channel.

Operation S502. The MME to which the relay UE belongs sends a third modify bearer request message to the S-GW.

Operation S503. The S-GW sends a third modify bearer response message to the MME to which the relay UE belongs.

Operation S504. The MME to which the relay UE belongs sends a forwarding path switch request message to an MME to which the remote UE belongs, where the forwarding path switch request message includes the identifier of the remote UE.

Operation S505. The MME to which the remote UE belongs sends a fourth modify bearer request message to an S-GW.

Operation S506. The S-GW sends a fourth modify bearer response message to the MME to which the remote UE belongs.

Operation S507. The MME to which the remote UE belongs sends a forwarding path switch response message to the MME to which the relay UE belongs.

Operation S508. The MME to which the relay UE belongs sends a third path switch response message to the target eNB.

Compared with the path switch procedure in FIG. 10, in the path switch procedure in FIG. 11, when the MME to which the relay UE belongs and the MME to which the remote UE belongs are a same MME, operations S504 and S507 may be omitted, so that a signaling procedure is reduced, and a response speed is higher.

An embodiment of this application provides an eNB, configured to perform the foregoing method. In this embodiment of this application, the eNB may be divided into function modules based on the foregoing method examples. For example, function modules corresponding to functions may be obtained through division, or two or more functions may be integrated into one processing module. The integrated module may be implemented in a form of hardware, or may be implemented in a form of a software function module. It should be noted that, in this embodiment of this application, module division is used as an example, and is merely logical function division. In an actual implementation, another division may be used.

Figure 12:
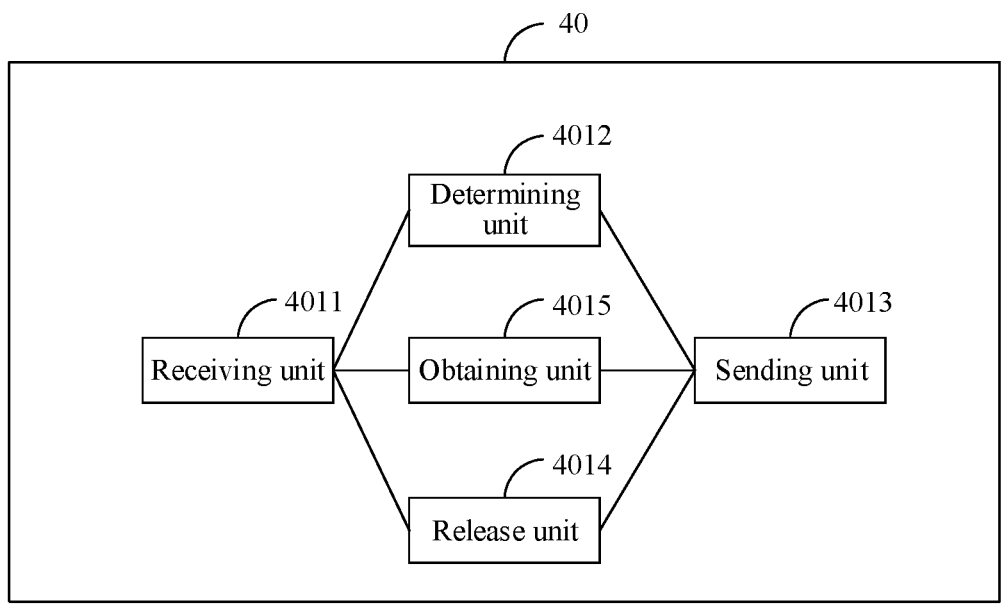
FIG. 12 is a structural diagram of an eNB according to an embodiment of this application.

When the function modules corresponding to the functions are obtained through division, FIG. 12 is a possible structural diagram of the eNB in the foregoing embodiments. An eNB 40 includes: a receiving unit 4011, a determining unit 4012, a sending unit 4013, a release unit 4014, and an obtaining unit 4015. The receiving unit 4011 is configured to support the eNB 40 in performing the process S212 in FIG. 6A and FIG. 6B, the processes S303, S306, S312, and S315 in FIG. 7A and FIG. 7B, the processes S3031, S3061, and S3121 in FIG. 8A and FIG. 8B, and the processes S3032, S3033, S3062, S3063, S3122, and S3123 in FIG. 9A and FIG. 9B. The determining unit 4012 is configured to support the eNB 40 in performing the process S101 in FIG. 4, the processes S201 and S206 in FIG. 6A and FIG. 6B, and the processes S301 and S315 in FIG. 7A and FIG. 7B. The sending unit 4013 is configured to support the eNB 40 in performing the processes S102 and S103 in FIG. 4, the processes S202, S207, S213, S214, and S217 in FIG. 6A and FIG. 6B, the processes S302, S305, S307, S313, and S314 in FIG. 7A and FIG. 7B, the processes S3021, S3051, and S3071 in FIG. 8A and FIG. 8B, the processes S3022, S3023, S3052, S3053, S3072, and S3073 in FIG. 9A and FIG. 9B, the processes S401 and S405 in FIG. 10, and the process S501 in FIG. 11. The release unit 4014 is configured to support the eNB 40 in performing the process S224 in FIG. 6A and FIG. 6B and the process S316 in FIG. 7A and FIG. 7B. The obtaining unit 4015 is configured to support the eNB 40 in performing the process S304 in FIG. 7A and FIG. 7B. All related content of operations in the foregoing method embodiments may be cited in function descriptions of corresponding function modules, and details are not described herein again.

Figure 13:
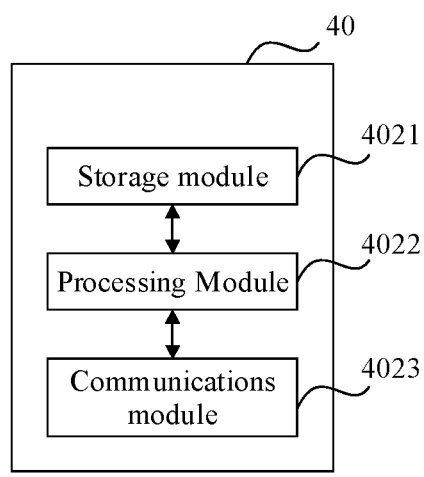
FIG. 13 is a structural diagram of another eNB according to an embodiment of this application.

When the integrated unit is used, FIG. 13 is a possible structural diagram of the eNB in the foregoing embodiments. An eNB 40 includes a processing module 4022 and a communications module 4023. The processing module 4022 is configured to control and manage actions of the eNB 40. For example, the processing module 4022 is configured to support the eNB 40 in performing the process S101 in FIG. 4, the processes S201 and S206 in FIG. 6A and FIG. 6B, the processes S301 and S315 in FIG. 7A and FIG. 7B, the process S224 in FIG. 6A and FIG. 6B, the process S316 in FIG. 7A and FIG. 7B, and the process S304 in FIG. 7A and FIG. 7B. The communications module 4023 is configured to support communication between the eNB and another entity, for example, communication with a function module or a network entity shown in FIG. 1. The eNB 40 may further include a storage module 4021, configured to store program code and data of the eNB.

The processing module 4022 may be the processor 201 in FIG. 2. The communications module 4023 may be the transceiver 203 and the network interface 204 in FIG. 2. The storage module 4021 may be the memory 202 in FIG. 2.

An embodiment of this application provides an MME, configured to perform the foregoing method. In this embodiment of this application, the MME may be divided into function modules based on the foregoing method examples. For example, function modules corresponding to functions may be obtained through division, or two or more functions may be integrated into one processing module. The integrated module may be implemented in a form of hardware, or may be implemented in a form of a software function module. It should be noted that, in this embodiment of this application, module division is used as an example, and is merely logical function division. In an actual implementation, another division may be used.

Figure 14:
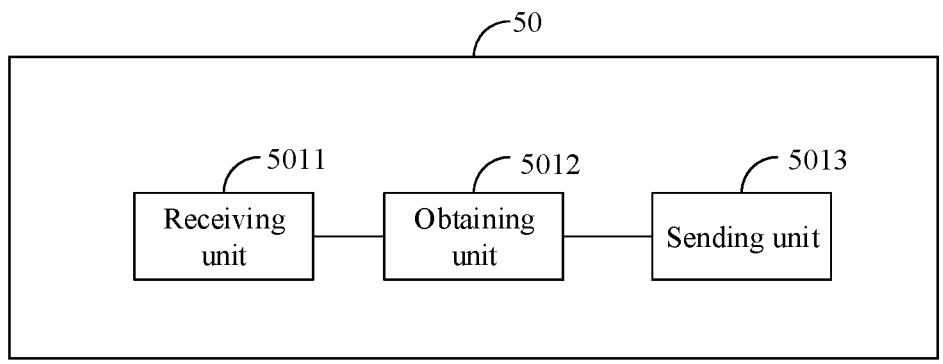
FIG. 14 is a structural diagram of an MME according to an embodiment of this application.

When the function modules corresponding to functions are obtained through division, FIG. 14 is a possible structural diagram of the MME in the foregoing embodiments. An MME 50 includes: a receiving unit 5011, an obtaining unit 5012, and a sending unit 5013. The receiving unit 5011 is configured to support the MME 50 in performing the processes S104 and S106 in FIG. 4, and the processes S203, S208, S210, S218, and S220 in FIG. 6A and FIG. 6B. The obtaining unit 5012 is configured to support the MME 50 in performing the process S1052 in FIG. 5A and FIG. 5B. The sending unit 5013 is configured to support the MME 50 in performing the processes S105 and S107 in FIG. 4, the processes S1051, 1052, S1071, and S1072 in FIG. 5A and FIG. 5B, the processes S204, S205, S209, S211, S219, S221, and S223 in FIG. 6A and FIG. 6B, the processes S402, S404, S406, and S408 in FIG. 10, and the processes S502, S504, S505, S507, and S508 in FIG. 11. All related content of operations in the foregoing method embodiments may be cited in function descriptions of corresponding function modules, and details are not described herein again.

Figure 15:
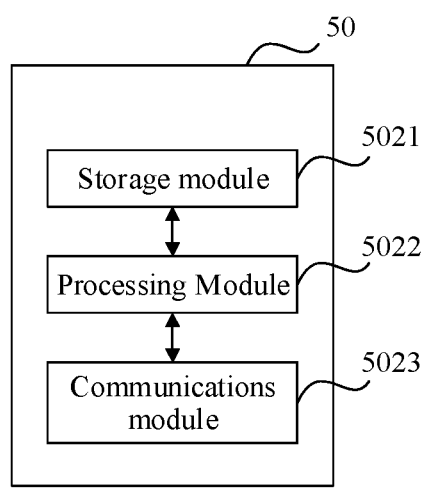
FIG. 15 is a structural diagram of another MME according to an embodiment of this application.

When the integrated unit is used, FIG. 15 is a possible structural diagram of the MME in the foregoing embodiments. An MME 50 includes a processing module 5022 and a communications module 5023. The processing module 5022 is configured to control and manage actions of the MME 50. For example, the processing module 5022 is configured to support the MME 50 in performing the process S1052 in FIG. 5A and FIG. 5B. The communications module 5023 is configured to support communication between the MME and another entity, for example, communication with a function module or a network entity shown in FIG. 1. The MME 50 may further include a storage module 5021, configured to store program code and data of the MME.

The processing module 5022 may be the processor 301 in FIG. 2. The communications module 5023 may be the network interface 303 in FIG. 2. The storage module 5021 may be the memory 302 in FIG. 2. The methods in the embodiments may be applied to the processor, and the processor may be an integrated circuit chip.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover system, comprising:
a first source mobility management apparatus; and
a source access network apparatus serving a relay user equipment (UE) and a remote UE;
wherein the source access network apparatus is configured to:
send a handover required message to the first source mobility management apparatus, wherein the handover required message comprises first identifier information of the relay UE and second identifier information of the remote UE, and the handover required message indicates a handover of both the relay UE and the remote UE to a target access network apparatus; and
wherein the first source mobility management apparatus is configured to:
receive the handover required message; and
send a first mobility management context of the relay UE and a second mobility management context of the remote UE to a target mobility management apparatus to which the target access network apparatus belongs, to handover both the remote UE and the relay UE to the target access network apparatus.

2. The handover system according to claim 1, wherein to send the first mobility management context of the relay UE and the second mobility management context of the remote UE to the target mobility management apparatus, the first source mobility management apparatus is configured to:
send a first redirection request message to the target mobility management apparatus, wherein the first redirection request message comprises the first mobility management context and the second mobility management context.

3. The handover system according to claim 1, wherein to send the first mobility management context of the relay UE and the second mobility management context of the remote UE to the target mobility management apparatus, the first source mobility management apparatus is configured to:
send a second redirection request message to the target mobility management apparatus, wherein the second redirection request message comprises the first mobility management context; and
send a third redirection request message to the target mobility management apparatus, wherein the third redirection request message comprises the second mobility management context and third identifier information of the relay UE.

4. The handover system according to claim 3, wherein the first source mobility management apparatus is a source mobility management apparatus of the remote UE and the relay UE.

5. The handover system according to claim 1, wherein the first identifier information comprises at least one of: a globally unique temporary identity (GUTI), a system architecture evolution (SAE)-temporary mobile subscriber identity (S-TMSI), a mobility management entity (MME)-temporary mobile subscriber identity (M-TMSI), or a UE S1 application protocol (S1-AP) identity.

6. The handover system according to claim 1, wherein
the handover required message further comprises group handover indication information, and
the first source mobility management apparatus is further configured to:
determine that the handover of both the relay UE and the remote UE to the target access network apparatus is a group handover based on the group handover indication information.

7. The handover system according to claim 1, wherein
the handover required message further comprises a message type of a message header, and
the first source mobility management apparatus is further configured to:
determine that the handover of both the relay UE and the remote UE to the target access network apparatus is a group handover based on the message type of the message header.

8. The handover system according to claim 1, wherein
the handover required message further comprises an association relationship between the relay UE and the remote UE, and
the first source mobility management apparatus is further configured to:
determine that the handover of both the relay UE and the remote UE to the target access network apparatus is a group handover based on the association relationship between the relay UE and the remote UE.

9. A handover system, comprising:
a first source mobility management apparatus serving a relay user equipment (UE);
a second source mobility management apparatus serving a remote UE; and
a source access network apparatus serving the relay UE and the remote UE;
wherein the source access network apparatus is configured to:
send a first handover required message to the first source mobility management apparatus serving the relay UE, wherein the first handover required message indicates a handover of the relay UE to a target access network apparatus; and
send a second handover required message to the second source mobility management apparatus serving the remote UE, wherein the second handover required message comprises first identifier information of the relay UE, and the second handover required message indicates a handover of the remote UE to the target access network apparatus and an association of the remote UE with the relay UE;
the first source mobility management apparatus is configured to:
receive the first handover required message; and
send a second redirection request message to a target mobility management apparatus, wherein the second redirection request message comprises first mobility management context of the relay UE; and the second source mobility management apparatus is configured to:

receive the second handover required message; and send a third redirection request message to the target mobility management apparatus, wherein the third redirection request message comprises second mobility management context of the remote UE and third identifier information of the relay UE.

10. The handover system according to claim 9, wherein the first source mobility management apparatus is a source mobility management apparatus of the relay UE and the second source mobility management apparatus is a source mobility management apparatus of the remote UE.

11. The handover system according to claim 9, wherein the first source mobility management apparatus is further configured to:

obtain the third identifier information based on the first identifier information.

12. The handover system according to claim 9, wherein the first identifier information comprises at least one of: a globally unique temporary identity (GUTI), a system architecture evolution (SAE)-temporary mobile subscriber identity (S-TMSI), a mobility management entity (MME)-temporary mobile subscriber identity (M-TMSI), or a UE S1 application protocol (S1-AP) identity.

13. A source mobility management apparatus, comprising:

a processor; and a memory coupled to the processor and storing instructions that, when executed by the processor, cause the source mobility management apparatus to:

receive a handover required message from a source access network apparatus serving a relay user equipment (UE) and a remote UE, wherein the handover required message comprises first identifier information of the relay UE and second identifier information of the remote UE, and the handover required message indicates a handover of both the relay UE and the remote UE to a target access network apparatus; and send a first mobility management context of the remote UE and a second mobility management context of the relay UE to a target mobility management apparatus to which the target access network apparatus belongs, to handover both the remote UE and the relay UE to the target access network apparatus.

14. The source mobility management apparatus according to claim 13, wherein to send the first mobility management context of the remote UE and the second mobility management context of the relay UE to the target mobility management apparatus, the instructions, which when executed by the processor, cause the source mobility management apparatus to:

send a first redirection request message to the target mobility management apparatus, wherein the first redirection request message comprises the first mobility management context and the second mobility management context.

15. The source mobility management apparatus according to claim 13, wherein to send the first mobility management context of the remote UE and the second mobility management context of the relay UE to the target mobility management apparatus, the instructions, which when executed by the processor, cause the source mobility management apparatus to:

send a second redirection request message to the target mobility management apparatus, wherein the second redirection request message comprises the first mobility management context; and send a third redirection request message to the target mobility management apparatus, wherein the third redirection request message comprises the second mobility management context and the first identifier information of the relay UE.

16. The source mobility management apparatus according to claim 13, wherein the source mobility management apparatus is a source mobility management apparatus of the remote UE and the relay UE.

17. The source mobility management apparatus according to claim 13, wherein the first identifier information comprises at least one of: a globally unique temporary identity (GUTI), a system architecture evolution (SAE)-temporary mobile subscriber identity (S-TMSI), a mobility management entity (MME)-temporary mobile subscriber identity (M-TMSI), or a UE S1 application protocol (S1-AP) identity.

18. The source mobility management apparatus according to claim 13, wherein the handover required message further comprises group handover indication information, and the instructions, which when executed by the processor, further cause the source mobility management apparatus to:

determine that the handover of both the relay UE and the remote UE to the target access network apparatus is a group handover based on the group handover indication information.

19. The source mobility management apparatus according to claim 13, wherein the handover required message further comprises a message type of a message header, and the instructions, which when executed by the processor, further cause the source mobility management apparatus to:

determine that the handover of both the relay UE and the remote UE to the target access network apparatus is a group handover based on the message type of the message header.

20. The source mobility management apparatus according to claim 13, wherein the handover required message further comprises an association relationship between the relay UE and the remote UE, and the instructions, which when executed by the processor, further cause the source mobility management apparatus to:

determine that the handover of both the relay UE and the remote UE to the target access network apparatus is a group handover based on the association relationship between the relay UE and the remote UE.

21. A handover method, comprising:

sending, by a source access network apparatus, a handover required message to a first source mobility management apparatus, wherein the handover required message comprises first identifier information of a relay user equipment (UE) and second identifier information of a remote UE, and the handover required message indicates a handover of both the relay UE and the remote UE to a target access network apparatus;

receiving, by the first source mobility management apparatus, the handover required message; and sending, by the first source mobility management apparatus, a first mobility management context of the relay UE and a second mobility management context of the remote UE to a target mobility management apparatus to which the target access network apparatus belongs, to handover both the remote UE and the relay UE to the target access network apparatus.

22. The handover method according to claim 21, wherein the sending the first mobility management context of the relay UE and the second mobility management context of the remote UE to the target mobility management apparatus comprises:

sending, by the source access network apparatus, a first redirection request message to the target mobility management apparatus, wherein the first redirection request message comprises the first mobility management context and the second mobility management context.

23. The handover method according to claim 21, wherein the sending the first mobility management context of the relay UE and the second mobility management context of the remote UE to the target mobility management apparatus comprises:

sending, by the first source mobility management apparatus, a second redirection request message to the target mobility management apparatus, wherein the second redirection request message comprises the first mobility management context; and sending, by the first source mobility management apparatus, a third redirection request message to the target mobility management apparatus, wherein the third redirection request message comprises the second mobility management context and third identifier information of the relay UE.

24. A handover method, comprising:

sending, by a source access network apparatus, a first handover required message to a first source mobility management apparatus serving a relay user equipment (UE), wherein the first handover required message indicates a handover of the relay UE to a target access network apparatus;

receiving, by the first source mobility management apparatus, the first handover required message; and sending, by a source access network apparatus, a second handover required message to a second source mobility management apparatus serving the remote UE, wherein the second handover required message comprises first identifier information of the relay UE, and the second handover required message indicates a handover of the remote UE to the target access network apparatus and an association of the remote UE with the relay UE;

receiving, by the second source mobility management apparatus, the second handover required message;

sending, by the second source mobility management apparatus, a third redirection request message to a target mobility management apparatus, wherein the third redirection request message comprises second mobility management context of the remote UE and third identifier information of the relay UE.

* * * * *